(12) United States Patent
Kim et al.

(10) Patent No.: US 9,608,785 B2
(45) Date of Patent: Mar. 28, 2017

(54) CHANNEL ESTIMATION METHOD AND APPARATUS USING REFERENCE SIGNAL

(71) Applicant: LG ELECTRONICS INC., Seoul (KR)

(72) Inventors: Hyungtae Kim, Anyang-si (KR); Jonghyun Park, Anyang-si (KR); Hanbyul Seo, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 197 days.

(21) Appl. No.: 14/359,064

(22) PCT Filed: Jan. 11, 2013

(86) PCT No.: PCT/KR2013/000245
§ 371 (c)(1),
(2) Date: May 16, 2014

(87) PCT Pub. No.: WO2013/105811
PCT Pub. Date: Jul. 18, 2013

(65) Prior Publication Data
US 2014/0314041 A1    Oct. 23, 2014

Related U.S. Application Data

(60) Provisional application No. 61/585,633, filed on Jan. 11, 2012.

(51) Int. Cl.
*H04L 25/02* (2006.01)
*H04L 5/00* (2006.01)
(Continued)

(52) U.S. Cl.
CPC ........ *H04L 5/0048* (2013.01); *H04L 25/0204* (2013.01); *H04L 25/0224* (2013.01); *H04B 7/0456* (2013.01); *H04B 7/0626* (2013.01)

(58) Field of Classification Search
None
See application file for complete search history.

(56) References Cited

U.S. PATENT DOCUMENTS

2010/0238824 A1* 9/2010 Farajidana ........... H04B 7/0417
370/252
2010/0238877 A1  9/2010 Nam et al.
(Continued)

FOREIGN PATENT DOCUMENTS

CN         102045762 A  *  5/2011  ............ H04W 24/10
KR    10-2010-0121445      11/2010
(Continued)

OTHER PUBLICATIONS

PCT International Application No. PCT/KR2013/000245, Written Opinion of the International Searching Authority dated May 9, 2013, 10 pages.
(Continued)

*Primary Examiner* — Charles C Jiang
*Assistant Examiner* — Kyaw Z Soe
(74) *Attorney, Agent, or Firm* — Lee Hong Degerman Kang & Waimey

(57) ABSTRACT

The present invention relates to a wireless communication system, and more specifically, to a method and an apparatus for estimating a channel using a reference signal. According to one embodiment of the present invention, a method in which a terminal estimates a channel in a wireless communication system may comprise the steps of: receiving a cell-specific reference signal (CRS) and a channel state information-reference signal (CSI-RS) from a base station; generating CSI of a channel estimated using the CRS on the basis of a channel estimated using the CSI-RS and a mapping relationship between the CRS port and the CSI-RS port; reporting the generated CSI to the base station; and
(Continued)

demodulating data on the basis of the channel estimated using the CRS.

14 Claims, 12 Drawing Sheets

(51) Int. Cl.
    *H04B 7/06*         (2006.01)
    *H04B 7/0456*     (2017.01)

(56) References Cited

U.S. PATENT DOCUMENTS

| | | | | |
|---|---|---|---|---|
| 2010/0284484 A1* | 11/2010 | Jongren | ............... | H04B 7/0639 375/267 |
| 2011/0141987 A1* | 6/2011 | Nam | ..................... | H04L 1/0003 370/329 |
| 2011/0194551 A1* | 8/2011 | Lee | ..................... | H04B 7/0626 370/342 |
| 2011/0249602 A1 | 10/2011 | Wennstrom et al. | | |
| 2012/0020230 A1* | 1/2012 | Chen | ..................... | H04L 1/0028 370/252 |
| 2012/0176965 A1* | 7/2012 | Zhu | ..................... | H04B 7/0689 370/328 |
| 2012/0287875 A1* | 11/2012 | Kim | ..................... | H04W 76/046 370/329 |
| 2013/0021926 A1* | 1/2013 | Geirhofer | ............. | H04L 5/0048 370/252 |
| 2013/0051240 A1* | 2/2013 | Bhattad | ................... | H04L 5/005 370/241 |
| 2013/0094411 A1* | 4/2013 | Zhang | ................... | H04W 72/04 370/281 |
| 2013/0114425 A1* | 5/2013 | Sayana | ................. | H04B 7/024 370/252 |

FOREIGN PATENT DOCUMENTS

KR         10-1053635        8/2011
KR     10-2012-0002875     1/2012

OTHER PUBLICATIONS

PCT International Application No. PCT/KR2013/000245, Written Opinion of the International Searching Authority dated May 9, 2013, 12 pages.

* cited by examiner

CHANNEL ESTIMATION METHOD AND APPARATUS USING REFERENCE SIGNAL

CROSS-REFERENCE TO RELATED APPLICATIONS

This application is the National Stage filing under 35 U.S.C. 371 of International Application No. PCT/KR2013/000245, filed on Jan. 11, 2013, which claims the benefit of U.S. Provisional Application Ser. No. 61/585,633, filed on Jan. 11, 2012, the contents of which are hereby incorporated by reference herein in their entirety.

TECHNICAL FIELD

Following description relates to a wireless communication system, and more particularly, to a method of estimating a channel using a reference signal and an apparatus therefor.

BACKGROUND ART

In a legacy wireless communication system, a user equipment measures/estimates a downlink channel using a cell-specific reference signal (hereinafter abbreviated CRS) from a base station to generate/calculate channel state information and may demodulate data based on the channel measured/estimated using the CRS.

Meanwhile, in an enhanced wireless communication system, a channel state information-reference signal (hereinafter abbreviated CSI-RS), which is a separate reference signal for the CSI, and a demodulation reference signal (hereinafter abbreviated DMRS), which is a separate reference signal for demodulation, are introduced. A user equipment in a transmission mode using the CSI-RS and the DMRS generates/calculates the CSI based on the channel measured/estimated using the CSI-RS and may perform demodulation based on the channel measured/estimated using the DMRS.

DISCLOSURE OF THE INVENTION

Technical Task

In performing operations of generating/calculating CSI based on a CSI-RS and performing demodulation using a CRS, one technical task of the present invention is to provide a method of precisely and efficiently determining channel state information on a channel used for performing data demodulation. Another technical task of the present invention is to provide a method for a user equipment to compensate for a difference between a channel based on the CRS and a channel based on the CSI-RS. The other technical task of the present invention is to provide a method for a base station to compensate for the difference between the channel based on the CRS and the channel based on the CSI-RS.

Technical tasks obtainable from the present invention are non-limited the above-mentioned technical task. And, other unmentioned technical tasks may be clearly understood from the following description by those having ordinary skill in the technical field to which the present invention pertains.

Technical Solution

To achieve these and other advantages and in accordance with the purpose of the present invention, as embodied and broadly described, according to one embodiment, a method of estimating a channel by a user equipment in a wireless communication system, includes receiving a cell-specific reference signal (CRS) and a channel state information-reference signal (CSI-RS) from a base station, generating CSI on a channel estimated using the CRS based on CSI on a channel estimated using the CSI-RS and a mapping relation between a CRS port and a CSI-RS port, reporting the generated CSI to the base station and demodulating data based on the channel estimated using the CRS.

To further achieve these and other advantages and in accordance with the purpose of the present invention, according to a different embodiment, a user equipment device estimating a channel in a wireless communication system includes a transmission module, a reception module and a processor, the processor configured to receive a cell-specific reference signal (CRS) and a channel state information-reference signal (CSI-RS) from a base station using the reception module, the processor configured to generate CSI on a channel estimated using the CSI-RS and CSI on a channel estimated using the CRS based on a mapping relation between a CRS port and a CSI-RS port, the processor configured to report the generated CSI to the base station using the transmission module, the processor configured to demodulate data based on the channel estimated using the CRS.

In the embodiments according to the present invention, following description may be commonly applied.

The mapping relation between the CRS port and the CSI-RS port is defined as $$\begin{bmatrix} y_{15} \\ \vdots \\ y_{14+CSIRSp} \end{bmatrix} = M \begin{bmatrix} z_0 \\ \vdots \\ z_{CRSp-1} \end{bmatrix},$$

$CSIRS_p$ corresponds to a number of the CSI-RS port, $y_i$ corresponds to an $i^{th}$ CSI-RS port, $CRS_p$ corresponds to a number of the CRS port, $Z_j$ corresponds to a $j^{th}$ CRS port and M may correspond to a matrix indicating the mapping relation between the CRS port and the CSI-RS port.

The matrix M may correspond to a composition matrix consisting of an identity matrix or identity rows.

A mapping relation between a layer of the data and the CRS port is defined as $$\begin{bmatrix} z_0 \\ \vdots \\ z_{CRSp-1} \end{bmatrix} = W \begin{bmatrix} x_1 \\ \vdots \\ x_l \end{bmatrix},$$

$CRS_p$ corresponds to a number of the CRS port, $Z_j$ corresponds to a $j^{th}$ CRS port, 1 corresponds to a number of the layer of the data, $X_k$ corresponds to a $k^{th}$ layer and W may correspond to a precoding matrix applied to the data.

If a single CSI-RS port is configured, the W corresponds to 1 and if two or more CSI-RS port are configured, the W may correspond to the precoding matrix applied to the data.

A mapping relation between a layer of the data and the CSI-RS port is defined as $$\begin{bmatrix} y_{15} \\ \vdots \\ y_{14+CSIRSp} \end{bmatrix} = MW \begin{bmatrix} x_1 \\ \vdots \\ x_l \end{bmatrix},$$

$CSIRS_p$ corresponds to a number of the CSI-RS port, $y_i$ corresponds to an $i^{th}$ CSI-RS port, 1 corresponds to a number of the layer of the data, $X_k$ corresponds to a $k^{th}$ layer, M corresponds to the mapping relation between the CRS port and the CSI-RS port and W may correspond to a precoding matrix applied to the data.

A mapping relation between a layer of the data, the CRS port and the CSI-RS port is defined as $$\begin{bmatrix} y_{15} \\ \vdots \\ y_{14+CSIRSp} \end{bmatrix} = MW \begin{bmatrix} x_1 \\ \vdots \\ x_l \end{bmatrix} = M \begin{bmatrix} z_0 \\ \vdots \\ z_{CRSp-1} \end{bmatrix},$$

$CSIRS_p$ corresponds to a number of the CSI-RS port, $y_i$ corresponds to an $i^{th}$ CSI-RS port, $CRS_p$ corresponds to a number of the CRS port, $Z_j$ corresponds to a $j^{th}$ CRS port, 1 corresponds to a number of the layer of the data, $X_k$ corresponds to a $k^{th}$ layer, M corresponds to the mapping relation between the CRS port and the CSI-RS port and W may correspond to a precoding matrix applied to the data.

A maximum rank fed back by the user equipment maybe configured by a minimum value among a number of the CSI-RS port and a number of the CRS port.

A number of the CSI-RS port may be configured identical to a number of the CRS port.

The CSI may be calculated based on an assumption that no UE-specific reference signal exists.

The data is demodulated based on the CRS in a subframe configured as a non-MBSFN (multicast-broadcast single frequency network) subframe and the data may be demodulated based on a UE-specific reference signal in a subframe configured as an MBSFN subframe.

If a narrowband CRS is applied, the data may be demodulated based on the CRS in a non-MBSFN subframe and an MBSFN subframe.

The generating the CSI may include the steps of generating a first CSI based on the channel estimated using the CSI-RS and generating a second CSI by modifying the first CSI based on the mapping relation between the CRS port and the CSI-RS port. And, the reporting the CSI may include transmitting the second CSI.

The user equipment may be configured with a transmission mode for calculating the first CSI using the CSI-RS and performing demodulation using the CRS.

It is to be understood that both the foregoing general description and the following detailed description are exemplary and explanatory and are intended to provide further explanation of the invention as claimed.

Advantageous Effects

According to the present invention, in performing operations of generating/calculating CSI based on a CSI-RS and performing demodulation using a CRS, a method of precisely and efficiently determining channel state information on a channel used for performing data demodulation may be provided. And, according to the present invention, a method for a user equipment to compensate for a difference between a channel based on the CRS and a channel based on the CSI-RS may be provided. And, according to the present invention, a method for a base station to compensate for the difference between the channel based on the CRS and the channel based on the CSI-RS ca be provided.

Effects obtainable from the present invention may be non-limited by the above mentioned effect. And, other unmentioned effects may be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
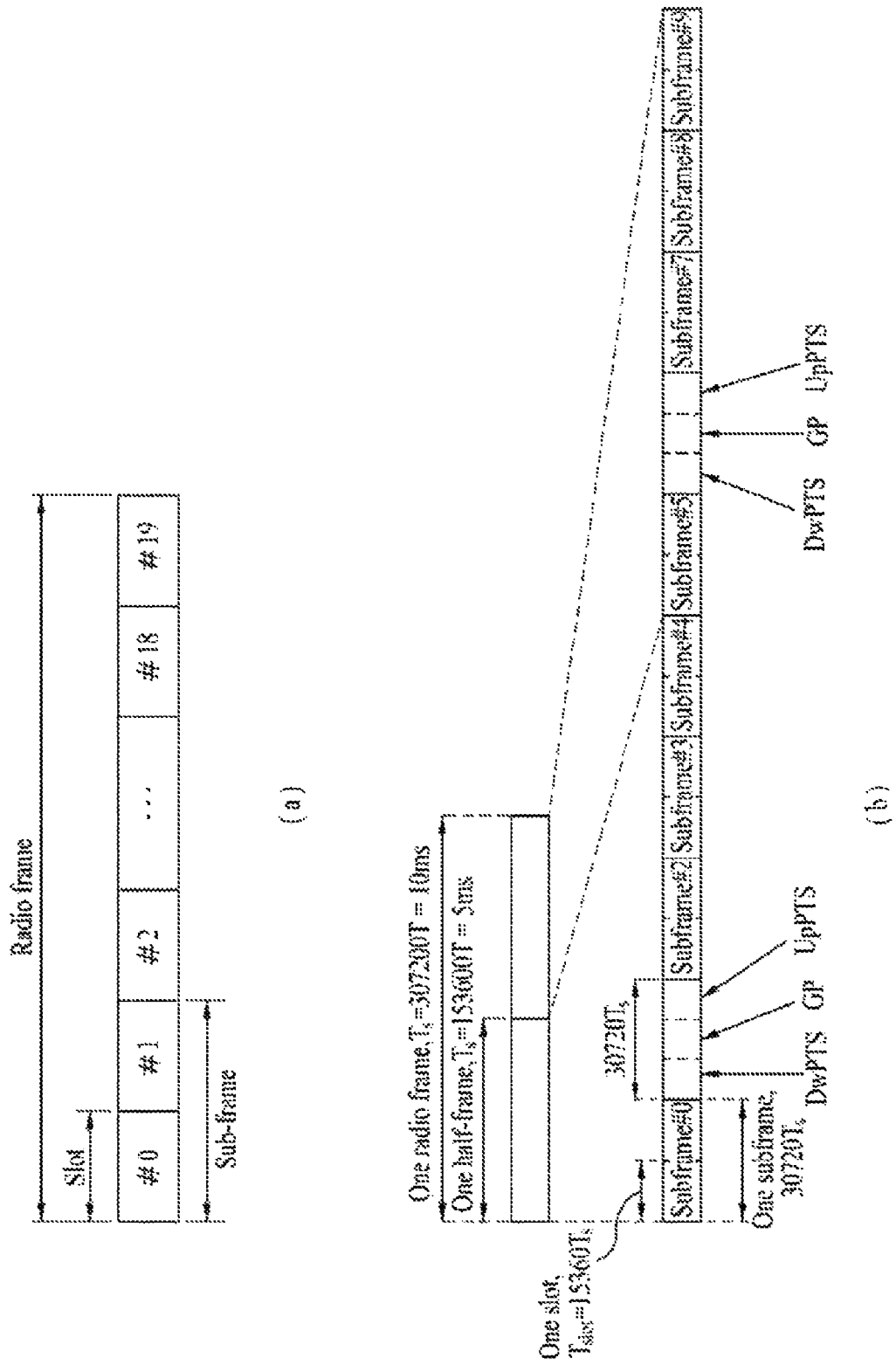
FIG. 1 is a diagram for explaining a structure of a radio frame.

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or may be substituted for corresponding configurations or features of another embodiment.

In this specification, embodiments of the present invention are described centering on the data transmission/reception relations between a base station and a user equipment. In this case, a base station has a meaning of a terminal node of a network directly communicating with a user equipment. In this disclosure, a specific operation explained as performed by a base station may be performed by an upper node of the base station in some cases.

In particular, in a network constructed with a plurality of network nodes including a base station, it is apparent that various operations performed for communication with a user equipment may be performed by a base station or other network nodes except the base station. 'Base station (BS)' may be substituted with such a terminology as a fixed station, a Node B, an eNode B (eNB), an access point (AP) and the like. A relay may be substituted with such a terminology as a relay node (RN), a relay station (RS), and the like. And, 'terminal' may be substituted with such a terminology as a user equipment (UE), an MS (mobile station), an MSS (mobile subscriber station), an SS (subscriber station), or the like.

Specific terminologies used in the following description are provided to help understand the present invention and the use of the specific terminologies may be modified into a different form in a range of not deviating from the technical idea of the present invention.

Occasionally, to prevent the present invention from getting vaguer, structures and/or devices known to the public are skipped or may be represented as block diagrams centering on the core functions of the structures and/or devices. Wherever possible, the same reference numbers will be used throughout the drawings to refer to the same or like parts.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA may be implemented with such a radio technology as UTRA (universal terrestrial radio access), CDMA 2000 and the like. TDMA may be implemented with such a radio technology as GSM/GPRS/EDGE (Global System for Mobile communications)/General Packet Radio Service/Enhanced Data Rates for GSM Evolution). OFDMA may be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP ($3^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE and LTE-A standards, by which the technical idea of the present invention may be non-limited.

A structure for a radio frame of 3GPP LTE system is explained with reference to FIG. 1.

In a cellular OFDM (orthogonal frequency division multiplex) radio packet communication system, UL/DL (uplink/downlink) data packet transmission is performed by a unit of subframe. And, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

FIG. 1 (a) is a diagram for a structure of a type 1 radio frame. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP (cyclic prefix). The CP may be categorized into an extended CP and a normal CP. For instance, in case that OFDM symbols are configured by the normal CP, the number of OFDM symbols included in one slot may correspond to 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may correspond to 6. If a channel status is unstable (e.g., a UE is moving at high speed), it may be able to use the extended CP to further reduce the inter-symbol interference.

FIG. 1 (b) is a diagram for a structure of a downlink radio frame of type 2. A type 2 radio frame includes 2 half frames. Each of the half frame includes 5 subframes, a DwPTS (downlink pilot time slot), a GP (guard period), and an UpPTS (uplink pilot time slot). Each of the subframes includes 2 slots. The DwPTS is used for initial cell search, synchronization, or a channel estimation in a user equipment. The UpPTS is used for channel estimation of a base station and matching a transmission synchronization of a user equipment. The guard period is a period for eliminating interference generated in uplink due to multi-path delay of a downlink signal between uplink and downlink. Meanwhile, one subframe includes 2 slots irrespective of a type of a radio frame.

The above-described structures of the radio frame are exemplary only. And, the number of subframes included in a radio frame, the number of slots included in the subframe and the number of symbols included in the slot may be modified in various ways.

Figure 2:
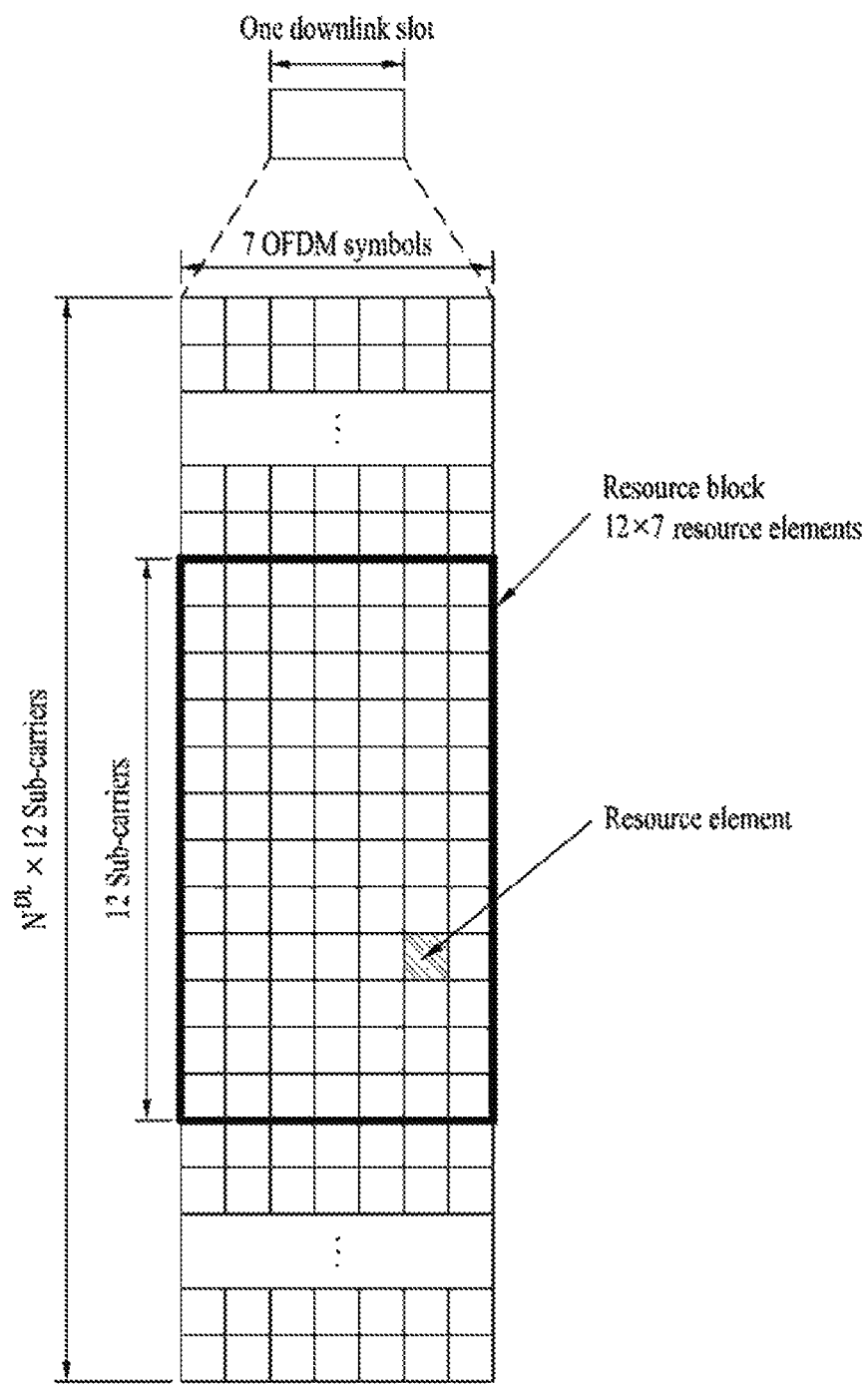
FIG. 2 is a diagram for a resource grid.

FIG. 2 is a diagram for a resource grid in a downlink slot. Referring to FIG. 2, one downlink (DL) slot includes 7 OFDM symbols in time domain and one resource block (RB) includes 12 subcarriers in frequency domain, by which the present invention may be non-limited. For instance, in case of a normal CP (Cyclic Prefix), one slot includes 7 OFDM symbols. In case of an extended CP, one slot may include 6 OFDM symbols. Each element on a resource grid is called a resource element. One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 3:
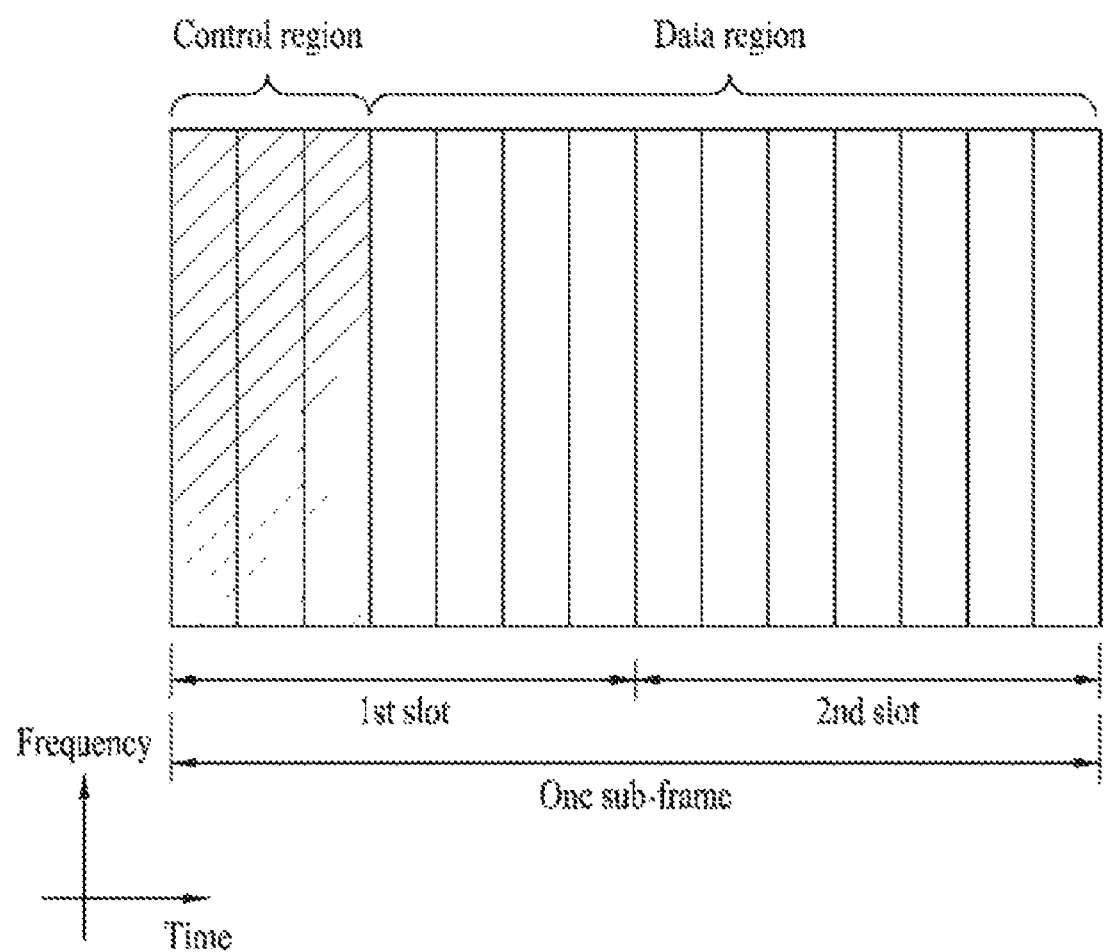
FIG. 3 is a diagram for a structure of a downlink subframe.

FIG. 3 is a diagram for a structure of a downlink (DL) subframe. Maximum 3 OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH is a response channel in response to UL transmission and includes an ACK/NACK signal. Control information carried on PDCCH may be called downlink control information (hereinafter abbreviated DCI). The DCI may include UL scheduling information, DL scheduling information or a UL transmit power control command for a random UE (user equipment) group. PDCCH is able to carry resource allocation and transmission format (or called a DL grant) of DL-SCH (downlink shared channel), resource allocation information (or called a UL grant) of UL-SCH (uplink shared channel), paging information on PCH (paging channel), system information on DL-SCH, resource allocation to an upper layer control message such as a random access response transmitted on PDSCH, a set of transmission power control commands for individual user equipments within a random user equipment (UE) group, activation of VoIP (voice over IP) and the like. A plurality of PDCCHs may be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs. A base station determines PDCCH format in accordance with DCI to transmit to a user equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC may be masked with a unique identifier of the user equipment, i.e., C-RNTI (i.e., Cell-RNTI). If the PDCCH is provided for a paging message, the CRC may be masked with a paging indication identifier (e.g., P-RNTI (Paging-RNTI)). If the PDCCH is provided for system information, and more particularly, for a system information block (SIB), the CRC may be masked with a system information identifier (e.g., SI-RNTI (system information-RNTI). In order to indicate a random access response that is a response to a transmission of a random access preamble of a user equipment, CRC may be masked with RA-RNTI (random access-RNTI).

Figure 4:
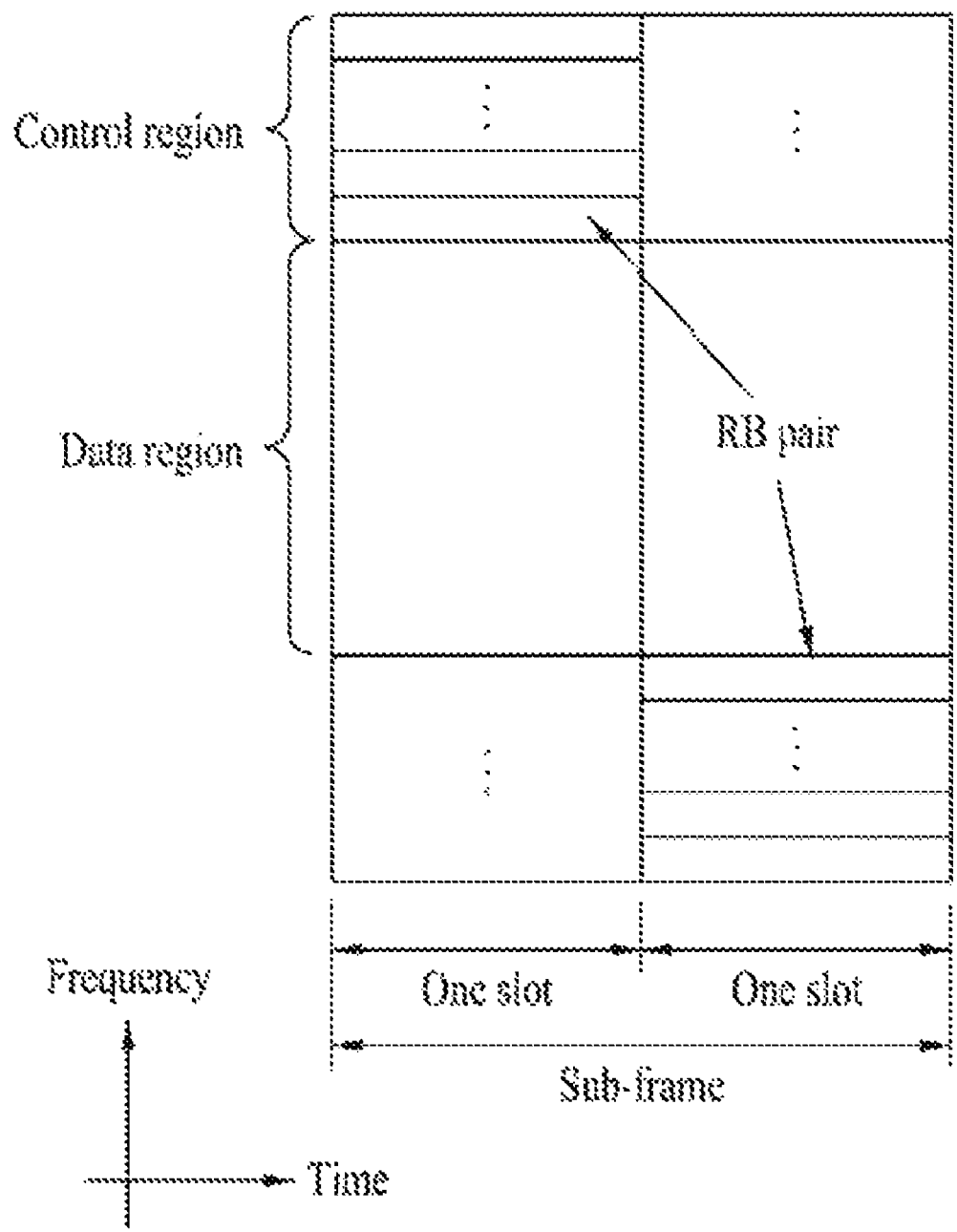
FIG. 4 is a diagram for a structure of an uplink subframe.

FIG. 4 is a diagram for a structure of an uplink (UL) subframe. Referring to FIG. 4, a UL subframe may be divided into a control region and a data region in frequency domain. A physical UL control channel (PUCCH), which includes UL control information, is assigned to the control region. And, a physical UL shared channel (PUSCH), which includes user data, is assigned to the data region. In order to maintain single carrier property, one user equipment does not transmit PUCCH and PUSCH simultaneously. PUCCH for one user equipment is assigned to a resource block pair (RB pair) in a subframe. Resource blocks belonging to the resource block (RB) pair may occupy different subcarriers in each of 2 slots. Namely, a resource block pair allocated to PUCCH is frequency-hopped on a slot boundary.

Reference Signal (RS)

When a packet is transmitted in a wireless communication system, since the packet is transmitted via a radio channel, a signal may be distorted in the course of transmission. In order for a receiving end to correctly receive a distorted signal, it may be preferable that the distorted and received signal is corrected using channel information. In order to find out the channel information, a signal known to both of a transmitting end and the receiving end is transmitted and finds out the channel information with the extent of distortion when the signal is received on a channel. The signal is called a pilot signal or a reference signal.

When a data is transmitted/received using MIMO antenna, it may be preferable that a channel state between a transmitting antenna and a receiving antenna is detected in order for a receiving end to correctly receive the data. Hence, in order for the receiving end to detect the channel state, each transmitting antenna of the transmitting end may preferably have an individual reference signal.

DL reference signals are classified into a common reference signal (CRS) shared by all user equipments in one cell and a dedicated reference signal (DRS) for a specific user equipment only. The transmitting end may be able to provide the receiving end with information for demodulation and channel measurement using these reference signals (i.e., CRS and DRS).

The receiving end (e.g., a user equipment) measures a channel state using the CRS and may be then able to feed back such an indicator related to a channel equality as a channel quality indicator (CQI), a precoding matrix index (PMI), a rank indicator (RI) and the like to the transmitting end (e.g. a base station) in response to the measured channel state. In the embodiments of the present invention, CRS may be named a cell-specific reference signal (cell-specific RS). On the other hand, a reference signal related to a feedback of channel state information (CSI) may be defined as CSI-RS.

DRS may be transmitted to user equipments via resource elements if data demodulation on PDSCH is required. A user equipment may be able to receive a presence or non-presence of DRS through upper layer signaling. The DRS is effective only if mapped by a corresponding PDSCH signal. In the embodiments of the present invention, DRS may be called a user equipment-specific reference signal (UE-specific RS) or a demodulation reference signal (DMRS).

Figure 5:
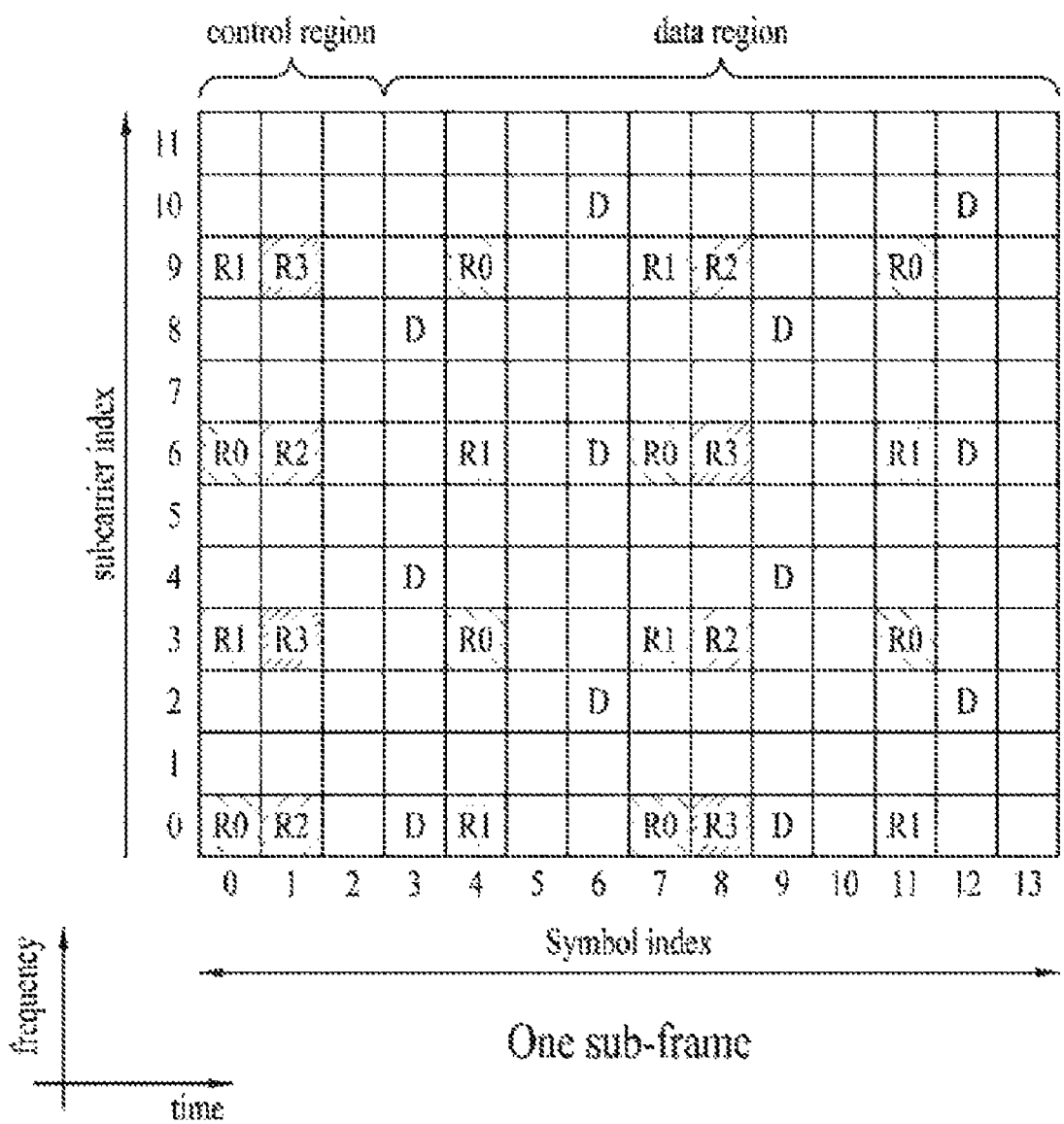
FIG. 5 is diagram for explaining a downlink reference signal.

FIG. 5 is a diagram for a pattern of CRS and DRS defined by a legacy 3GPP LTE system (e.g., release-8) mapped to a downlink resource block (RB) pair. The downlink resource block pair as a unit of mapping a reference signal may be represented as 'one subframe in time domain*12 subcarriers in frequency domain'. In particular, one resource block pair on a time axis (x axis) has a length of 14 OFDM symbols in case of a normal cyclic prefix (normal CP) and has a length of 12 OFDM symbols in case of an extended cyclic prefix (extended CP). FIG. 5 shows a resource block pair in case of a normal CP.

FIG. 5 shows positions of reference signals on a resource block pair in a system supporting 4 antennas by a base station. In FIG. 5, resource elements (RE) represented as 'R0', 'R1', 'R2', and 'R3' indicate positions of the CRS for an antenna port 0, 1, 2, and 3, respectively. Meanwhile, resource elements represented as 'ID' in FIG. 5 indicates positions of the DRS.

In the following description, CRS is explained in more detail.

The CRS is used to estimate a channel of a physical antenna and is distributed to a whole frequency band as a reference signal capable of being commonly received by all user equipments situated within a cell. And, the CRS may be used for channel quality information (CSI) and a data demodulation.

The CRS is defined by various formats according to antenna configuration of a transmitting side (base station). 3GPP LTE system (e.g., release-8) supports various antenna configurations. A DL signal transmitting side (e.g., base station) includes 3 kinds of antenna configuration such as a single transmitting antenna, 2 transmitting antennas, and 4 transmitting antennas. In case that a base station uses a single transmitting antenna, a reference signal for a single antenna port is arranged. In case that the base station uses 2 transmitting antennas, the reference signal for 2 transmitting antennas ports is arranged using a time division multiplexing (TDM) scheme and/or a frequency division multiplexing (FDM) scheme. In particular, different time resources and/or different frequency resources are allocated to the reference signal for the 2 antennas ports to distinguish each of the reference signals. Moreover, in case that the base station uses 4 transmitting antennas, the reference signal for 4 transmitting antennas ports is arranged using the TDM scheme and/or the FDM scheme. Channel information estimated by a DL signal receiving side (user equipment) may be used to demodulate the data transmitted using such a transmission scheme as a single antenna transmission, a transmission diversity, a closed-loop spatial multiplexing, an open-loop spatial multiplexing, or a multi-user MIMO.

In case that a MIMO antenna is supported, when a reference signal is transmitted from a specific antenna port, the reference signal is transmitted to the position of resource elements specified according to a reference signal pattern and is not transmitted to the position of resource elements specified for a different antenna port.

A rule of mapping CRC to a resource block is defined as follows.

$$k = 6m + (v + v_{shift}) \bmod 6 \quad \text{[Formula 1]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Formula 1, k and l indicate a subcarrier index and a symbol index, respectively. P indicates an antenna port index. $N_{symb}^{DL}$ indicates the number of OFDM symbol in one DL slot and $N_{RB}^{EL}$ indicates the number of radio resource allocated to a downlink. $n_s$ indicates a slot index and $N_{ID}^{cell}$ indicates a cell ID. A mod indicates a modulo calculation. A position of the reference signal in frequency domain varies depends on a $V_{shift}$ value. Since the $V_{shift}$ value depends on the cell ID, the position of the reference signal may have different frequency shift values according to a cell.

More specifically, in order to enhance channel estimation performance via the CRS, the position of the CRS may be shifted in frequency domain according to a cell. For instance, in case that a reference signal is positioned with an interval of 3 subcarriers, reference signals in one cell are assigned to a $n^{th}$ subcarrier and the reference signal in a different cell is assigned to a $(3k+1)^{th}$ subcarrier. In a single antenna port point of view, reference signals are arranged with an interval of 6 resource elements in frequency domain and separated from the reference signal assigned to a different antenna port with an interval of 3 resource elements.

And, power boosting may be applied to a CRS. The power boosting means to transmit a reference signal with higher power in a manner of bring power from a different RE instead of the RE allocated for the reference signal among the REs in one OFDM symbol.

A position of a reference signal in time domain is arranged starting from a symbol index (1) 0 of each slot with a constant interval. Time interval is differently defined according to a length of a cyclic prefix. In case of a normal cyclic prefix, the reference signal is positioned at the symbol index 0 and 4 of a slot. In case of an extended prefix, the reference signal is positioned at the symbol index 0 and 3 of a slot. The reference signal, which is required for the antenna port having a maximum value among the 2 antenna ports, is defined within an OFDM symbol. Hence, in case of 4 transmitting antennas transmission, the reference signal for the antenna port 0 and 1 is positioned at the symbol index 0 and 4 of a slot (in case of extended prefix, symbol index 0 and 3) and the reference signal for the antenna port 2 and 3 is positioned at the symbol index 1 of a slot. The position of the reference signal for the antenna port 2 and 3 in frequency domain is exchanged with each other in a $2^{nd}$ slot.

In the following description, a DRS is explained in more detail.

The DRS (or UE-specific reference signal) is used to demodulate data. In MIMO antenna transmission, a precoding weighted value used for a specific user equipment is used for a reference signal as it is. By doing so, when a user equipment receives the reference signal, the user equipment may estimate an equivalent channel corresponding to a channel with which a precoding weighted value transmitted from each transmitting antenna and a transport channel are combined.

A legacy 3GPP LTE system (e.g., release-8) supports maximum 4 transmitting antennas and defines a DRS for a rank 1 beamforming. The DRS for the rank 1 beamforming may indicate a reference signal for an antenna port index 5 as well. A rule of mapping DRS to a resource block is defined as follows. Formula 2 indicates a case of a normal cyclic prefix.

$$k = (k') \bmod N_{sc}^{RB} + N_{sc}^{RB} \cdot n_{PRB} \quad \text{[Formula 2]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

-continued $$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots 3N_{RB}^{PDSCH} - 1$$

$$v_{shift} = N_{ID}^{cell} \bmod 3$$

In Formula 2, k and l indicate a subcarrier index and a symbol index, respectively. P indicates an antenna port index. $N_{SC}^{RB}$ indicates a size of a resource block in frequency domain and is represented as the number of subcarrier. $n_{PRB}$ indicates the number of physical resource block. $N_{RB}^{PDSCH}$ indicates a frequency band of a resource block for a PDSCH transmission. $n_s$ indicates a slot index and $N_{ID}^{cell}$ indicates a cell ID. mod indicates a modulo calculation. A position of the reference signal depends on a $V_{shift}$ value in frequency domain. Since the $V_{shift}$ value depends on the cell ID, the position of the reference signal may have different frequency shift values according to a cell.

Meanwhile, MIMO of a high order, multi-cell transmission, an advanced MU-MIMO and the like are considered in LTE-A (advanced) system which is an evolved version of 3GPP LTE. In order to efficiently manage a reference signal and support an advanced transmission scheme, DRS-based data demodulation is considering. In particular, aside from a DRS (antenna port index 5) for a rank 1 beamforming defined in a legacy 3GPP LTE (e.g., release 8), a DRS (UE-specific reference signal or DMRS) for two or more layers may be defined to support data transmission via an additional antenna.

Figure 6:
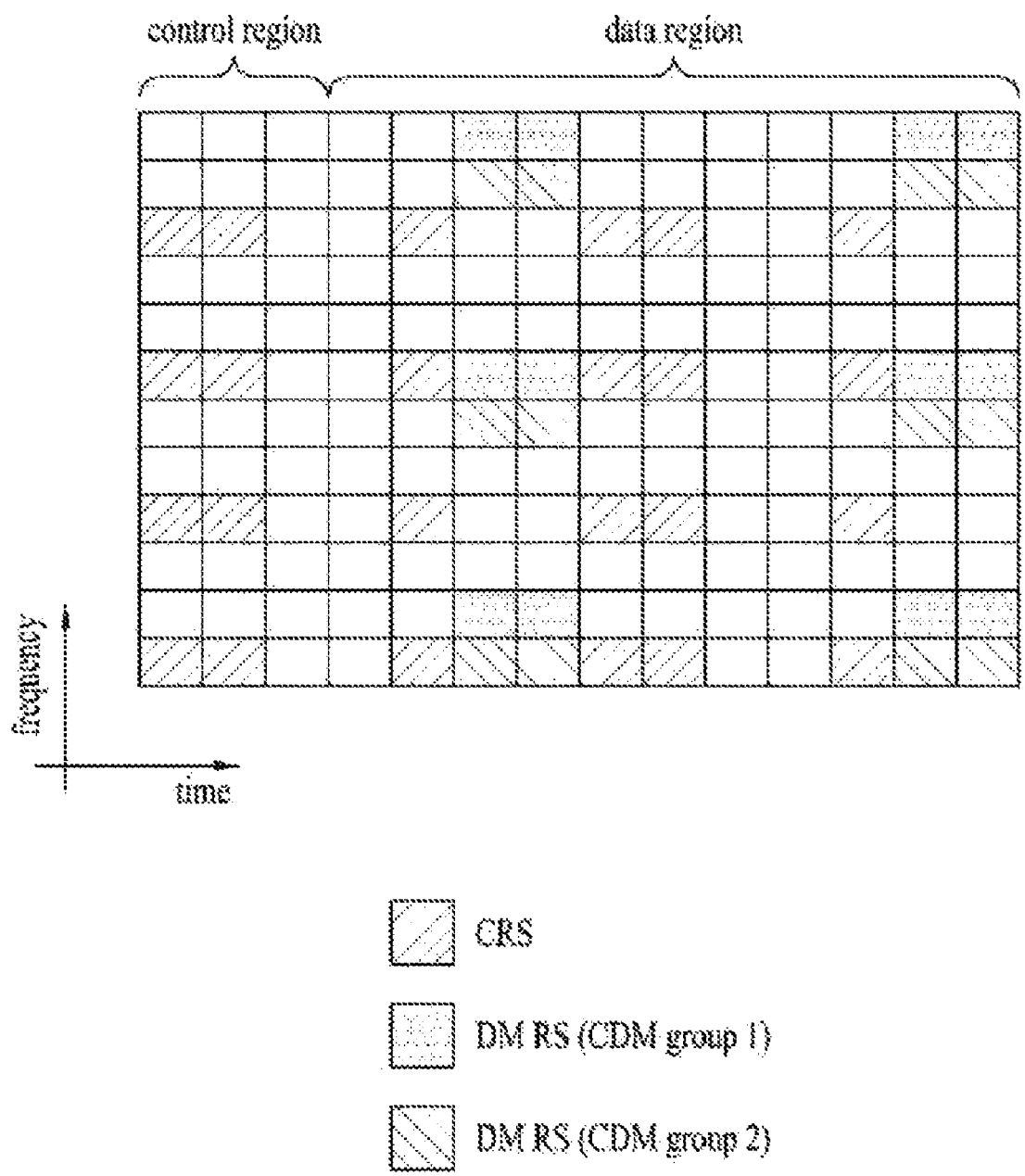
FIG. 6 is a diagram for an example of a DMRS pattern defined in LTE-A system.

FIG. 6 is a diagram for an example of a DMRS pattern defined in LTE-A system.

FIG. 6 shows a position of a resource element to which a DMRS is transmitted on one resource block pair (in case of a normal CP, 14 OFDM symbols in time domain×12 subcarriers in frequency domain) in which DL data is transmitted. The DMRS may be transmitted in response to 8 antenna ports (antenna port index 7 to 14) additionally defined in LTE-A system. The DMRS for antenna ports different from each other may be distinguished from each other in a manner of being positioned at frequency resources (subcarriers) different from each other and/or time resources (OFDM symbols) different from each other (i.e., the DM RS for antenna ports different from each other may be multiplexed by FDM and/or TDM scheme). And, the DMRS for antenna ports different from each other positioned at an identical time-frequency resource may be distinguished from each other by an orthogonal code (i.e., the DMRS for antenna ports different from each other may be multiplexed by CDM scheme).

Meanwhile, a separate reference signal (CSI-RS), which is used for measuring channel state information for a new antenna port, may be defined in an advanced wireless communication system (e.g., LTE-A system).

Figure 7:
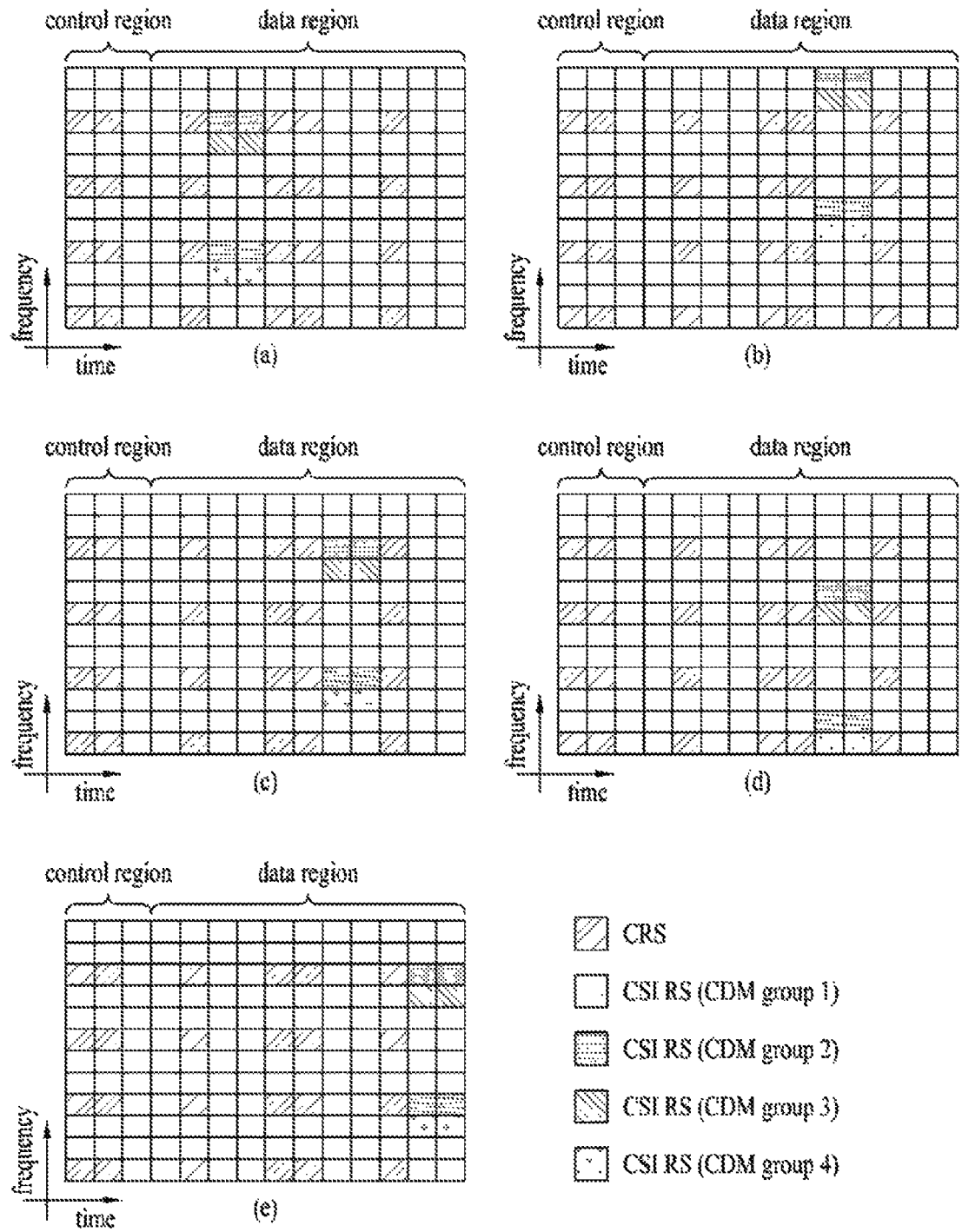
FIG. 7 is a diagram for examples of a CSI-RS pattern defined in LTE-A system.

FIG. 7 is a diagram for examples of a CSI-RS pattern defined in LTE-A system. FIG. 7 shows a position of a resource element to which a CSI-RS is transmitted on one resource block pair (in case of a normal CP, 14 OFDM symbols in time domain×12 subcarriers in frequency domain) in which DL data is transmitted. One CSI-RS pattern among patterns depicted in FIG. 7 (a) to FIG. 7 (e) may be used in a prescribed DL subframe. The CSI-RS may be transmitted in response to 8 antenna ports (antenna port index 15, 16, 17, 18, 19, 20, 21 and 22) additionally defined in LTE-A system. The CSI-RS for antenna ports different from each other may be distinguished from each other in a manner of being positioned at frequency resources (subcarriers) different from each other and/or time resources (OFDM symbols) different from each other (i.e., the CSI-RS for antenna ports different from each other may be multiplexed by FDM and/or TDM scheme). And, the CSI-RS for antenna ports different from each other positioned at an identical time-frequency resource may be distinguished from each other by an orthogonal code (i.e., the CSI-RS for antenna ports different from each other may be multiplexed by CDM scheme). Referring to the example of FIG. 7 (a), CSI-RSs for an antenna port 15 and 16 may be positioned at resource elements (REs) represented as a CSI-RS CDM group 1 and the CSI-RSs for the antenna port 15 and 16 may be multiplexed by the orthogonal code. Referring to the example of FIG. 7 (a), CSI-RSs for an antenna port 17 and 18 may be positioned at resource elements (REs) represented as a CSI-RS CDM group 2 and the CSI-RSs for the antenna port 17 and 18 may be multiplexed by the orthogonal code. Referring to the example of FIG. 7 (a), CSI-RSs for an antenna port 19 and 20 may be positioned at resource elements (REs) represented as a CSI-RS CDM group 3 and the CSI-RSs for the antenna port 19 and 20 may be multiplexed by the orthogonal code. Referring to the example of FIG. 7 (a), CSI-RSs for an antenna port 21 and 22 may be positioned at resource elements (REs) represented as a CSI-RS CDM group 4 and the CSI-RSs for the antenna port 21 and 22 may be multiplexed by the orthogonal code. A principle explained on the basis of FIG. 7 (a) may be identically applied to FIG. 7 (b) to FIG. 7 (e).

The RS patterns depicted in FIG. 5 to FIG. 7 are just examples. Various examples of the present invention may be non-limited to a specific RS pattern. In particular, in case of using an RS pattern different from the RS patterns depicted in FIG. 5 to FIG. 7, various embodiments of the present invention may also be identically applied to the RS pattern.

Cooperative Multi-Point (CoMP)

According to an improved system performance requirement of a 3GPP LTE-A system, a CoMP transmission/reception technology MIMO (represented as a co-MIMO, a collaborative MIMO, a network MIMO, or the like) is proposed. The CoMP technology increases the performance of a user equipment situating at a cell edge and may increase an average sector throughput.

In general, in a multi-cell environment where a frequency reuse factor corresponds to 1, the performance of a user equipment situating at a cell boundary and the average sector throughput may be reduced due to inter-cell interference (ICI). In order to reduce the ICI, a legacy LTE system has applied a method for enabling the user equipment situating at a cell boundary to have an appropriate throughput performance using such a simple passive scheme as a fractional frequency reuse (FFR) via a UE-specific power control in an environment limited by the interference. Yet, it may be more preferable to reduce the ICI or reuse the ICI as a signal that the user equipment wants than to lower the use of a frequency resource per cell. In order to achieve the aforementioned purpose, CoMP transmission scheme may be applied.

The CoMP scheme applicable in DL may be largely classified into a joint processing (JP) scheme and a coordinated scheduling/beamforming (CS/CB) scheme.

The JP scheme may use a data in each point (base station) of a CoMP cooperative unit. The CoMP cooperative unit means a set of base stations used for a cooperative transmission scheme. The JP scheme may be classified into a joint transmission scheme and a dynamic cell selection scheme.

The joint transmission scheme indicates a scheme transmitting PDSCH from a plurality of points (a part or entire CoMP cooperative units) at a time. In particular, the data transmitted to single user equipment may be simultaneously transmitted from a plurality of transmission points. According to the joint transmission scheme, quality of a reception signal may be coherently or non-coherently enhanced. And, interference for a different user equipment may be actively eliminated.

The dynamic cell selection scheme indicates a scheme transmitting PDSCH from a point (of a CoMP cooperative unit) at a time. In particular, a data transmitted to single user equipment on a specific timing point is transmitted from one point. A different point within the cooperative unit does not transmit a data to the corresponding user equipment on the specific timing point. The point transmitting the data to the corresponding user equipment may be dynamically selected.

Meanwhile, according to CS/CB scheme, the CoMP cooperative units may cooperatively perform a beamforming of data transmission for single user equipment. In this case, although the data is transmitted from a serving cell only, a user scheduling/beamforming may be determined by a coordination of cells in a corresponding CoMP cooperative unit.

Meanwhile, in case of UL, a coordinated multi-point reception means to receive a signal transmitted by coordination of a plurality of points, which are geographically apart from each other. The CoMP scheme applicable to a case of UL may be classified into a joint reception (JR) and the coordinated scheduling/beamforming (CS/CB).

The JR scheme means that a signal transmitted on PUSCH is received by a plurality of receiving points. The CS/CB scheme means that PUSCH is received at one point and a user scheduling/beamforming is determined by coordination of cells in a CoMP cooperative unit.

In case of using the aforementioned CoMP system, multi-cell base station may commonly support data for a user equipment. And, each of the base stations supports one or more user equipments at the same time using a same radio frequency resource, thereby improving system performance. Moreover, a base station may perform a space division multiple access (SDMA) based on channel state information between the base station and a user equipment.

In a CoMP system, a serving base station and one or more cooperative base stations are connected with a scheduler via a backbone network. The scheduler may operate in a manner of receiving feedback of channel information on channel state between each user equipment and a cooperative base station measured by each base station via the backbone network. For instance, the scheduler may schedule information for a cooperative MIMO operation for the serving base station and the one or more cooperative base stations. In particular, the scheduler may directly give direction on the cooperative MIMO operation to each base station.

As mentioned in the foregoing description, the CoMP system may correspond to a system operating as a virtual MIMO system in a manner of binding a plurality of cells into one group. Basically, a communication scheme of a MIMO system using a plurality of antennas may be applied to the CoMP system.

Enhanced Method of Using Reference Signal

As mentioned in the foregoing description, a new transmission mode differentiated from a legacy transmission mode is defined in a system (e.g., LTE-A system) to which a CSI-RS is introduced. Specifically, according to a newly defined transmission mode 9 (TM 9), a UE generates CSI feedback information (e.g., RI, PMI and/or CQI) based on a channel measured/estimated based on a CSI-RS and may perform demodulation based on a channel measured/estimated based on a DMRS (or UE-specific RS or DRS). In particular, if a base station applies an identical precoding to the DMRS and data, the UE may properly demodulate the data based on a channel (i.e., precoded channel) estimated from the DMRS although the base station does not separately inform the UE of precoding information which is applied to the DMRS. For instance, according to the TM 9, the base station may use non-codebook based precoding in a manner of freely determining a transmission beam. By doing so, the base station may secure sufficient spatial freedom for implementing MU-MIMO or CoMP.

Yet, as mentioned earlier in FIG. 6, in performing an operation according to the TM 9, additional overhead occurs (i.e., the number of REs occupied by the DMRS increases) when the DMRS is transmitted. Moreover, in case that the number of UE increases, sufficient spatial freedom may be secured via codebook-based precoding. Hence, it is difficult to say that a demodulation scheme using the DMRS always guarantees an optimal performance.

Hence, a new RS managing scheme or a new transmission mode for generating CSI feedback information using a CSI-RS and performing demodulation using a CRS instead of the DMRS is under discussion. In the present invention, the aforementioned new transmission mode is called a transmission mode X (TM X). The present invention examines a problem which may occur when the CSI feedback information is generated based on channel estimation using the CSI-RS in accordance with the TM X and demodulation is performed based on channel estimation using the CRS and proposes a method capable of solving the problem.

Figure 8:
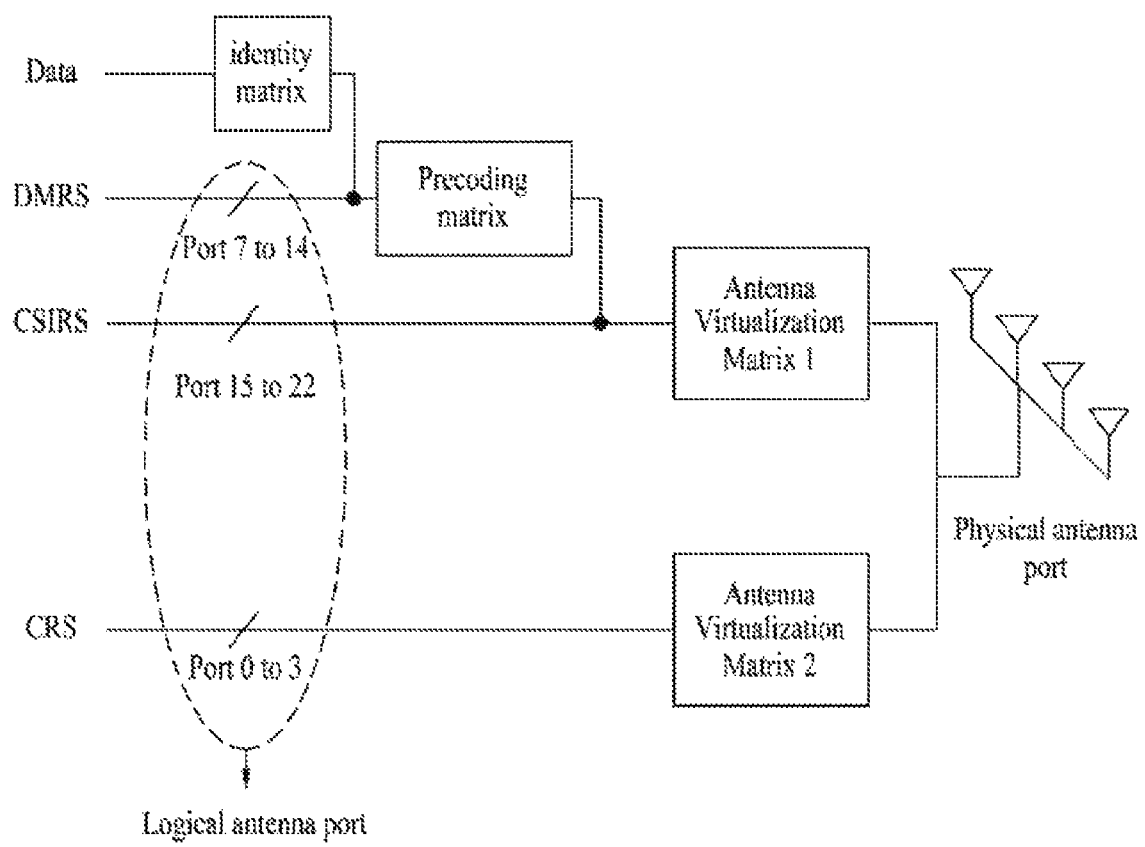
FIG. 8 is a diagram for explaining a relationship between a data, a DMRS, a CSI-RS and a CRS port in a TM 9.

FIG. 8 is a diagram for explaining a relationship between a data, a DMRS, a CSI-RS and a CRS port in a TM 9. Specifically, FIG. 8 shows mapping relations between logical antenna ports of DMRS, CSI-RS and CRS and a physical antenna port in the TM 9. And, FIG. 8 also shows a mapping relation between data (e.g., PDSCH corresponding to a user data transmission channel) and the logical antenna port.

A data transmission layer (e.g., PDSCH transmission layer) and a DMRS port (e.g., antenna port number 7 to 14) are one-to-one mapped. For instance, the PDSCH transmission layer 0 to 7 may be mapped to DMRS port 7 to 14, respectively. FIG. 8 shows a relation that data (e.g., PDSCH transmission layer) is mapped to a DMRS port via an identity matrix.

The DMRS port is mapped to a CSI-RS port via precoding. For instance, in case of performing a CSI report in the TM 9, a PDSCH signal on the DMRS port 7 to 14 for 8 layers corresponds to a symbol transmitted on the CSI-RS port 15 to 22. A relation between a PDSCH transmission layer and the CSI-RS port may be determined by a precoding matrix. In particular, the DMRS port 7 to 14 is mapped to the CSI-RS port 15 to 22 by the precoding matrix.

FIG. 8 shows an antenna virtualization matrix 1 and an antenna virtualization matrix 2. The antenna virtualization matrix is a matrix defining a mapping relation between the logical antenna port and the physical antenna port. The CSI-RS port is mapped to the physical antenna port via the antenna virtualization matrix 1 configured by a base station. And, similar to the CSI-RS, the DMRS port is mapped to the physical antenna port via the antenna virtualization matrix 1. Hence, although the logical antenna port (i.e., CSI-RS port 15 to 22) used for channel estimation on the timing of generating CSI and the logical antenna port (i.e., DMRS port 7 to 14) used for channel estimation on the timing of demodulating the CSI are different from each other in terms of a logical antenna port number, if precoding is not considered (e.g., if a precoding matrix corresponds to 1 or I), an identical channel is estimated when the CSI is generated and demodulated.

On the contrary, the CRS port (antenna port 0 to 3) is mapped to the physical antenna port via the antenna virtualization matrix 2 independent of the antenna virtualization matrix 1, which is applied to the DMRS port and the CSI-RS port.

Meanwhile, when a scheme of generating CSI feedback information based on channel measurement using the CSI-RS and performing demodulation based on channel estimation using the CRS is applied in accordance with the new transmission mode (i.e., TM X), the antenna virtualization according to the TM 9 mentioned earlier in FIG. 8 is not applied as it is.

Figure 9:
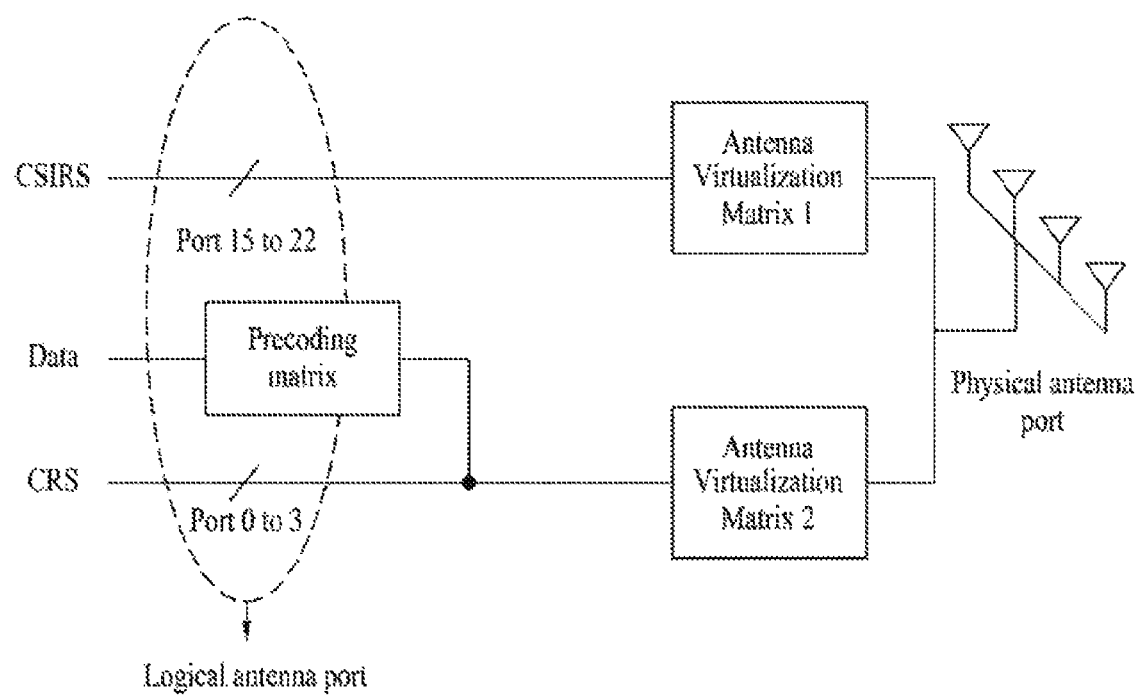
FIG. 9 is a diagram for explaining a relationship between a data, a CSI-RS and a CRS port in a TM X.

FIG. 9 is a diagram for explaining a relationship between a data, a CSI-RS and a CRS port in a TM X. For clarity, FIG. 9 does not show a DMRS since a channel is estimated using CRS for data demodulation.

As depicted in FIG. 9, independent antenna virtualization matrixes are applied to a CSI-RS port and a CRS port, respectively. In particular, an antenna virtualization matrix 1 may be applied to the CSI-RS port (i.e., antenna port 15 to 22) and an antenna virtualization matrix 2 may be applied to the CRS port (i.e., antenna port 0 to 3). And, data (e.g., PDSCH transmission layer) is mapped to the CRS port 0 to 3 via a precoding matrix and the antenna virtualization matrix 2 may be applied to the data.

In this case, it may assume that the antenna virtualization matrix 1 and 2 are represented as V1 and V2, respectively and an actual channel is represented as a matrix H. In this case, a UE may generate and feedback CSI information on an effective channel (H*V1) using the CSI-RS. Yet, since the effective channel carrying data corresponds to not (H*V1) but (H*V2), there may occur a problem that the CSI information calculated based on the (H*V1) may not properly indicates a state of the (H*V2) corresponding to a channel carrying the data.

In order to solve the aforementioned problem, when a CSI feedback information is generated based on a channel estimated using the CSI-RS and demodulation is performed based on a channel estimated using the CRS in accordance with the new transmission mode (i.e., TM X), the present invention proposes a method of compensating for a difference between the channel estimated using the CSI-RS and the channel estimated using the CRS.

Embodiment 1

According to the embodiment 1, a base station maps the CRS port onto the CSI-RS port and may inform a UE of information indicating a mapping relation. By doing so, in case of calculating CSI information, the UE may generate, calculate and report CSI in a manner of assuming the mapping relation and reflecting a difference between a channel estimated from a CSI-RS and a channel on which an actual data is transmitted.

Figure 10:
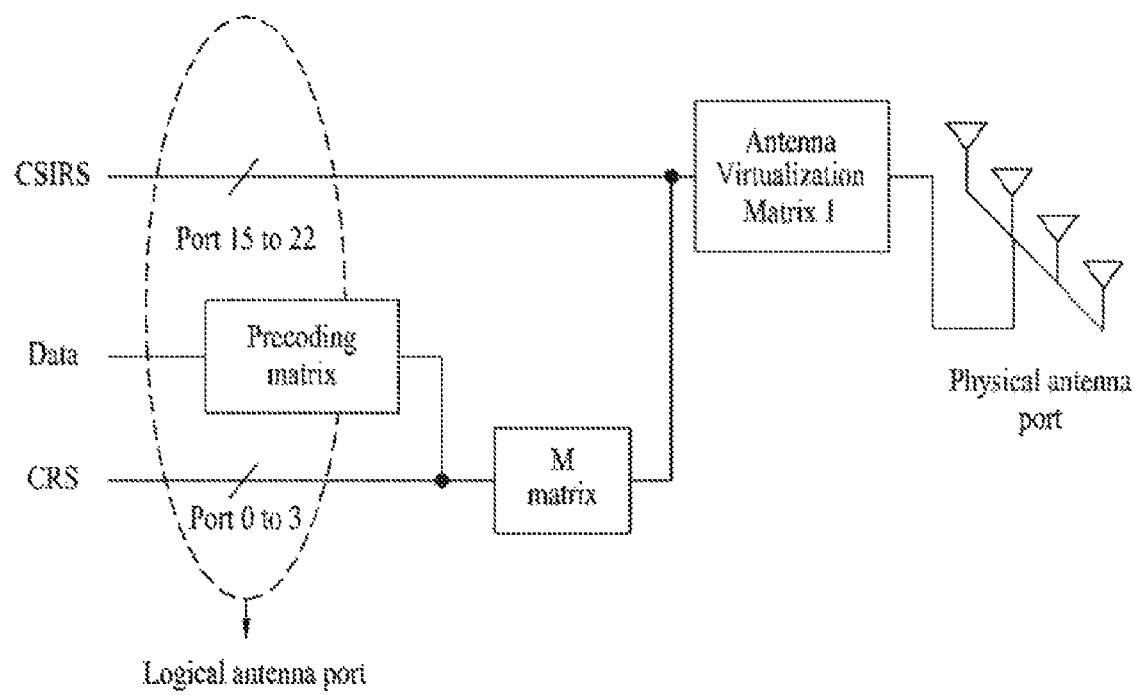
FIG. 10 is a diagram for explaining a relationship between a data, a CSI-RS and a CRS port according to one example of the present invention.

FIG. 10 is a diagram for explaining a relationship between a data, a CSI-RS and a CRS port according to one example of the present invention.

For instance, in case that a CRS port and a CSI-RS port are mapped to each other via a matrix M (i.e., a mapping relation between the CRS port and the CSI-RS port is represented by the matrix M), a relation between antenna ports may be represented as FIG. 10. As shown in FIG. 10, the CRS port is mapped to the CSI-RS port via the matrix M and the CRS port and the CSI-RS port may be commonly mapped to the physical antenna port via an antenna virtualization matrix 1 (i.e., V1). When the matrix M, which is applied to the CRS port shown in FIG. 9, and the V1 compare with the V1 and V2 in FIG. 8, it may be represented as M*V1=V2.

In this case, a UE generates CSI on an effective channel H*V1 using a CSI-RS and may generate a final CSI feedback information in consideration of the matrix M indicating a mapping relation between the CRS port and the CSI-RS port. In other word, the UE may compensate for a difference between a channel estimated using the CSI-RS and a channel estimated using the CRS.

An example of a relation between the CSI-RS port and the CRS port may be represented as Formula 3 to Formula 8 in the following.

$$\begin{bmatrix} y_{15} \\ y_{16} \end{bmatrix} = M \begin{bmatrix} z_0 \\ z_1 \end{bmatrix} \quad \text{[Formula 3]}$$

$$\begin{bmatrix} y_{15} \\ y_{16} \\ y_{17} \\ y_{18} \end{bmatrix} = M \begin{bmatrix} z_0 \\ z_1 \\ z_2 \\ z_3 \end{bmatrix} \quad \text{[Formula 4]}$$

$$\begin{bmatrix} y_{15} \\ y_{16} \end{bmatrix} = M \begin{bmatrix} z_0 \\ z_1 \\ z_2 \\ z_3 \end{bmatrix} \quad \text{[Formula 5]}$$

$$\begin{bmatrix} y_{15} \\ y_{16} \\ y_{17} \\ y_{18} \end{bmatrix} = M \begin{bmatrix} z_0 \\ z_1 \end{bmatrix} \quad \text{[Formula 6]}$$

$$\begin{bmatrix} y_{15} \\ y_{16} \\ y_{17} \\ y_{18} \\ y_{19} \\ y_{20} \\ y_{21} \\ y_{22} \end{bmatrix} = M \begin{bmatrix} z_0 \\ z_1 \end{bmatrix} \quad \text{[Formula 7]}$$

$$\begin{bmatrix} y_{15} \\ y_{16} \\ y_{17} \\ y_{18} \\ y_{19} \\ y_{20} \\ y_{21} \\ y_{22} \end{bmatrix} = M \begin{bmatrix} z_0 \\ z_1 \\ z_2 \\ z_3 \end{bmatrix} \quad \text{[Formula 8]}$$

In the aforementioned Formula 3 to 8, $y_i$ indicates $i^{th}$ CSI-RS port (or CSI-RS port number i) and $z_j$ indicates $j^{th}$ CRS port (or CRS port number j).

Specifically, the Formula 3 indicates a mapping relation between 2 CRC ports (i.e., CRS port 0 and 1) and 2 CSI-RS ports (i.e., CSI-RS port 15 and 16). The Formula 4 indicates a mapping relation between 4 CRC ports (i.e., CRS port 0 to 3) and 4 CSI-RS ports (i.e., CSI-RS port 15 to 18). The Formula 5 indicates a mapping relation between 4 CRC ports (i.e., CRS port 0 to 3) and 2 CSI-RS ports (i.e., CSI-RS port 15 and 16). The Formula 6 indicates a mapping relation between 2 CRC ports (i.e., CRS port 0 and 1) and 4 CSI-RS ports (i.e., CSI-RS port 15 to 18). The Formula 7 indicates a mapping relation between 2 CRC ports (i.e., CRS port 0 and 1) and 8 CSI-RS ports (i.e., CSI-RS port 15 to 22). The Formula 8 indicates a mapping relation between 4 CRC ports (i.e., CRS port 0 to 3) and 8 CSI-RS ports (i.e., CSI-RS port 15 to 22).

And, in the Formula 3 to 8, M corresponds to a matrix indicating a mapping between ports. $m_{ij}$ (an element or a factor corresponding to $i^{th}$ column and $j^{th}$ row in the matrix M) has a value of 1 or 0. If the $m_{ij}$ corresponds to 1, a CRS port j and a CSI-RS port i are mapped to each other. If the $m_{ii}$ corresponds to 0, mapping is not performed.

For instance, in the Formula 3, if the M corresponds to an identity matrix, a CRS port 0 is mapped to a CSI-RS port 15 and a CRS port 1 is mapped to a CSI-RS port 16. In Formula 4, if the M corresponds to an identity matrix, the CRS port 0, 1, 2 and 3 are mapped to the CSI-RS port 15, 16, 16 and 18, respectively.

In the Formula 5 to 8, the M may have a form that identity matrixes are combined with each other. For instance, in the Formula 5, 6, 7 and 8, the M may correspond to [I I], [I I]$^T$, [I I I I]$^T$ and [I I]$^T$, respectively. In this case, A$^T$ indicates a transposed matrix of a matrix A.

Besides the examples shown in Formula 3 to 8, when the number of CRS port or the number of CSI-RS port corresponds to 1, a mapping relation between the CRS port and the CSI-RS port may also be represented as the M.

A matrix M may be configured with a fixed value. Or, the matrix M may be semi-statically configured. Information on the matrix M may be provided to a UE via an upper layer (e.g., RRC (radio resource control) layer) signaling.

A Formula 9 in the following corresponds to an expression that generalizes the examples of the Formula 3 to 8.

$$\begin{bmatrix} y_{15} \\ \vdots \\ y_{14+CSIRSp} \end{bmatrix} = M \begin{bmatrix} z_0 \\ \vdots \\ z_{CRSp-1} \end{bmatrix} \quad \text{[Formula 9]}$$

In the Formula 9, CRS$_p$ indicates the number of CRS port and CSIRS$_p$ indicates the number of CSI-RS port. And, M may correspond to composition matrix consisting of an identity matrix or identity rows.

Referring back to the example of FIG. 9, data multiplied by a precoding matrix W is mapped to the CRS port. When multiple layer data stream is represented by x, a mapping relation between the CRS port and x may be represented as Formula 10 in the following.

$$\begin{bmatrix} z_0 \\ \vdots \\ z_{CRSp-1} \end{bmatrix} = W \begin{bmatrix} x_1 \\ \vdots \\ x_l \end{bmatrix} \quad \text{[Formula 10]}$$

In the Formula 10, CRS$_p$ indicates the number of CRS port and l indicates the number of layer. $x_k$ indicates a $k^{th}$ layer. And, in case that one CSI-RS port is configured only, W corresponds to 1. Otherwise (i.e., if two or more CSI-RS ports are configured), W may corresponds to a precoding matrix corresponding to PMI, which is applicable to x.

When the Formula 9 and 10 are considered at the same time, a mapping relation between a multiple layer data stream x and a CSI-RS port may be represented as Formula 11 in the following.

$$\begin{bmatrix} y_{15} \\ \vdots \\ y_{14+CSIRSp} \end{bmatrix} = MW \begin{bmatrix} x_1 \\ \vdots \\ x_l \end{bmatrix} \quad \text{[Formula 11]}$$

In the Formula 11, CSIRS$_p$ indicates the number of CSI-RS port and l indicates the number of layer. And, in case that one CSI-RS port is configured only, W corresponds to 1. Otherwise (i.e., if two or more CSI-RS ports are configured), W may corresponds to a precoding matrix corresponding to PMI, which is applicable to x. and, M may correspond to a matrix indicating a mapping relation between a CRS port and a CSI-RS port.

When the Formula 9 and 10 are considered at the same time, it may be represented as Formula 12 in the following.

$$\begin{bmatrix} y_{15} \\ \vdots \\ y_{14+CSIRSp} \end{bmatrix} = MW \begin{bmatrix} x_1 \\ \vdots \\ x_l \end{bmatrix} = M \begin{bmatrix} z_0 \\ \vdots \\ z_{CRSp-1} \end{bmatrix} \quad \text{[Formula 12]}$$

In the Formula 12, CSIRS$_p$ indicates the number of CSI-RS port and l indicates the number of layer. And, in case that one CSI-RS port is configured only, W corresponds to 1. Otherwise (i.e., if two or more CSI-RS ports are configured), W may corresponds to a precoding matrix corresponding to PMI, which is applicable to x. and, M may correspond to a matrix indicating a mapping relation between a CRS port and a CSI-RS port.

As mentioned in the foregoing description, in the TM X for generating CSI feedback information using a CSI-RS and performing demodulation using a CRS, in order to increase system efficiency by implementing a more simple operation, a restriction described in the following may be defined. For instance, it may consider a rank restriction and/or a port restriction.

In performing the rank restriction, a maximum rank capable of being fed back by a UE may be configured by a minimum value among the number of CSI-RS port and the number of CRS port. In case that the number of CSI-RS port is greater than the number of CRS port, since the maximum rank of a channel, which is estimated on timing of demodulation, is restricted to be less than the number of CRS port, rank information to be fed back is also restricted to be less than the number of CRS port. Moreover, in case that the number of CSI-RS port is greater than the number of CRS port, since the maximum rank of a channel, which is measured for CSI feedback, is restricted to the number of CSI-RS port, a maximum value of the rank information to be fed back is also restricted to the number of CSI-RS port.

In performing the port restriction, it is able to restrict that the number of CSI-RS port and the number of CRS port to be identically configured. This is because if the number of CSI-RS port and the number of CRS port are different from each other, complexity may increase when a UE calculates CSI. Additionally, the port restriction may be achieved in a manner that a CRS antenna port is one-to-one mapped to a CSI-RS antenna port. For instance, a $j^{th}$ (0≤j≤3, j is an integer) antenna port may be always one-to-one mapped to an $i^{th}$ (i=j+15) antenna port.

And, in the TM X for generating CSI feedback information using a CSI-RS and performing demodulation using a CRS, in case that a UE calculates CSI, it may additionally assume at least one of the followings. First of all, the CSI may be calculated based on an assumption that a DMRS (or UE-specific RS or DRS) is not transmitted. In particular, the UE may calculate the CSI in an assumption (e.g., assumption that PDSCH is transmitted to an RE position to which the DMRS is transmittable) that the DMRS overhead corresponds 0. Secondly, a final CSI may be calculated by utilizing a mapping relation (e.g., matrix M) between the CSI-RS port and the CRS port. In particular, the UE may calculate the CSI in a manner of assuming the mapping relation shown in Formula 9 to 12. For instance, the UE may generate/calculate the CSI on a channel for the CRS port based on a channel estimated using the CSI-RS and the mapping relation between the CRS port and the CSI-RS port. The UE calculates a temporary CSI (or first CSI) for the channel (e.g., H*V1) estimated using the CSI-RS, modifies the temporary CSI by considering an effective channel (e.g., H*M*V1) in which the matrix M is considered, and may calculate the final CSI (or a second CSI).

And, in the TM X for generating CSI feedback information using a CSI-RS and performing demodulation using a CRS, a DCI format of downlink scheduling information on the TM X may vary according to whether a fake MBSFN (multicast-broadcast single frequency network) subframe is configured.

In this case, the fake MBSFN subframe is recognized as a MBSFN subframe to a UE (e.g., legacy UE) operating according to a 3GPP LTE release 8/9 system. Yet, the fake MBSFN subframe is recognized as a subframe capable of being used for a different usage instead of MBSFN to a UE (e.g., advanced UE) operating according to 3GPP LTE-A system. For instance, similar to the MBSFN subframe, it may assume that a CRS may not be transmitted to a transmission region (e.g., PDSCH region) and data (e.g., PDSCH) is not transmitted or is transmitted with a low transmit power or a general transmit power in the fake MBSFN subframe.

For instance, in a heterogeneous network where a macro cell and a micro cell (e.g., pico cell) coexist, the macro cell may configure an ABS (almost blank subframe) to protect the pico cell. The ABS corresponds to a subframe transmitting a CRS only in a control region and a data region (refer to FIG. 3) of a downlink subframe and the subframe not transmitting other control information and data. Yet, such a downlink channel as a PBCH, a PSS, an SSS and the like and a downlink signal may be transmitted in the ABS. In order to get rid of interference due to the CRS from the data region of the subframe configured as an ABS, the ABS may be additionally configured as the fake MBSFN. In particular, it may assume that a CRS may not be transmitted in a data region in the subframe configured as the fake MBSFN and data (e.g., PDSCH) is not transmitted or is transmitted with a low transmit power or a general transmit power in the fake MBSFN subframe.

Since the CRS is not transmitted in the fake MBSFN ABS, a DMRS may be used to demodulate data. In particular, as mentioned in the foregoing description, demodulation should be performed using the DMRS in the fake MBSFN ABS in the TM X for generating CSI feedback information using a CSI-RS and performing demodulation using a CRS as well. Hence, when a transmission mode is configured in the TM X, a DCI format informing DMRS information should be provided to a UE.

Meanwhile, when the TM X is configured, since a CRS exists in a non-MBSFN subframe, CRS-based demodulation is performed instead of DMRS-based modulation. Hence, a DCI format including information on a precoder used by a base station should be provided to the UE.

Since the UE detects PDCCH carrying a DCI by a blind decoding scheme, a DCI format detected by the UE should be dependently changed according to whether a MBSFN subframe is configured. In particular, the UE may detect a DCI format informing the UE of DMRS information in a subframe configured as the MBSFN subframe and detect a DCI format including the information on the precoder used by the base station in a subframe configured as the non-MBSFN subframe. Moreover, in case that the TM X is configured in the UE, the UE may detect the DCI format informing the UE of DMRS information in the subframe configured as the MBSFN subframe and detect the DCI format including the information on the precoder used by the base station in the subframe configured as the non-MBSFN subframe. And, the UE calculates CSI in a manner of assuming DMRS overhead in the subframe configured as the MBSFN with a scheme identical to the TM 9 and the UE may calculate the CSI in a manner of assuming (e.g., assuming that PDSCH is transmitted to a RE position to which DMRS is transmittable) that the DMRS overhead corresponds to 0 in the subframe configured as the non-MBSFN.

Meanwhile, when the TM X is configured, in order to use an identical DCI format irrespective of whether a fake MBSFN subframe is configured, the present invention proposes to apply a narrow band CRS. Unlike a legacy CRS, which is transmitted to whole of a downlink frequency band (i.e., system bandwidth) allocated to the UE, the narrow band CRS means to transmit a CRS to a part of the band. For instance, in case of using the narrow band CRS, CRS transmission is permitted to a part of RB in the fake MBSFN subframe. If data of a UE is carried via a specific RB, the UE may perform demodulation of the data using a narrow band CRS existing in the specific RB. Hence, irrespective of whether the MBSFN is configured or not, the UE configured with the TM X detects the DCI format including the information on the precoder used by the base station and may be then able to perform downlink reception.

Embodiment 2

According to the present embodiment 2, a UE generates CSI based on a channel estimated from a CSI-RS and reports the CSI to a base station and the base station may schedule data transmission in consideration of a difference between a channel for a CRS port and a channel for a CSI-RS port.

For instance, referring to FIG. 9, the UE generates the CSI on an effective channel H*V1 using the CSI-RS and may report the CSI to the base station. The base station determines a precoding matrix practically capable of identically matching an effective channel (e.g., H*V1), which is calculated based on the CSI-RS, with an effective channel (e.g., H*V2), which is calculated based on a CRS, using the CSI fed back by the UE based on the CSI-RS. And, the base station may perform the data transmission based on the determined precoding matrix. In other word, the base station may compensate for a difference between the channel estimated using the CSI-RS and the channel estimated using the CRS. This may be represented as Formula 13 in the following.

$$H*V1*P1 = H*V2*P2 \qquad \text{[Formula 13]}$$

In Formula 13, P1 corresponds to a precoding matrix corresponding to PMI reported by the UE and P2 may correspond to a precoding matrix used by the base station for the data transmission. H indicates an actual downlink channel, V1 corresponds to an antenna virtualization matrix applied to the CSI-RS and V2 may correspond to an antenna virtualization matrix applied to the CRS.

When the base station determines the precoding matrix P2, which is applied to the data transmission, the base station may obtain the P2 satisfying the aforementioned Formula 13. In this case, the P2 is a precoding matrix corresponding to an element (i.e., codeword) in a codebook consisting of a set of quantized precoding matrixes. Information on the P2 may be provided to the UE on a control channel. Since the P2 corresponds to a quantized value including finite precision, there may not exist the P2, which precisely satisfies an equal mark of the Formula 13, in the codebook. Yet, the base station may determine the P2 as an approximate value satisfying the equal mark of the Formula 13 as much as possible.

And, as mentioned earlier in FIG. 10, in case of 'M*V1=V2', the Formula 13 may also be represented as Formula 14 in the following.

$$H*V1*P1=H*M*V1*P2 \quad \text{[Formula 14]}$$

In order to apply a scheme proposed by the present embodiment 2, a transmission mode 4 (TM 4), which uses a CRS to perform CSI feedback and demodulation in a legacy 3GPP LTE system, may be used as it is. Yet, in order to apply the scheme proposed by the present embodiment, it is necessary for the UE to support an operation of performing CSI feedback based on the CSI-RS while the UE basically operates according to the TM 4. To this end, it may add information indicating whether to perform the CSI-RS based-CSI feedback when a transmission mode is configured to the UE via an upper layer (e.g., RRC) signaling. For instance, when the information indicating whether to perform the CSI-RS based-CSI feedback is defined by an indicator of 1 bit-long, if a value of the indicator corresponds to 0, CSI calculated using a CRS is fed back according to the original TM 4 and if the value of the indicator corresponds to 1, CSI calculated using a CSI-RS may be fed back. In this case, when the UE calculates the CSI using the CSI-RS, the UE may calculate the CSI under an assumption that there is no DMRS overhead.

Embodiment 3

According to the present embodiment 3, an operation based on 2 codebooks may be supported to a system (e.g. 4 transmission antennas or 2 transmission antennas) including a less number of transmission antennas (Tx antenna).

According to a legacy 3GPP LTE/LTE-A system, a PMI codebook for 2Tx and 4Tx antenna system is designed by one codebook including 16 elements (i.e., codewords) per each rank. The PMI codebook for 8Tx antenna system determines a precoding matrix by a combination (or multiplication) of two codebooks including a codebook indicating channel information of a long-term attribute and a codebook indicating channel information of a short-term attribute. Compared to the single codebook based operation scheme for the 2Tx and the 4Tx antennas, the 2 codebooks based operation scheme for the 8Tx antennas is more effective in performing feedback on a precise channel.

According to the present invention, the 2 codebooks based operation scheme may be applied to the 2Tx and/or 4Tx antennas system. In this case, the 2 codebooks based operation scheme for the 2Tx and/or 4Tx antennas system may be supported via the aforementioned antenna port mapping while the codebook already designed for the 8Tx antennas system is used without newly designing 2 codebooks for the 2Tx and/or 4Tx antennas system.

For instance, assume a case that a CSI-RS of 8 ports is configured and a CRS of 2 ports or 4 ports is configured. In this case, a UE generates and reports CSI based on the CSI-RS and PMI may be generated/determined based on 2 codebooks. For instance, the UE may report a first PMI (W1 or i1) of a long-term attribute and a second PMI (W2 or i2) of a short-term attribute to a base station. In particular, the W1 and the W2 correspond to 2 codebooks based PMI for a channel which is estimated based on 8 ports CSI-RS.

In this case, as mentioned earlier with reference to FIG. 10, a mapping relation between a CSI-RS port and a CRS port may be given as a matrix M. For instance, as mentioned earlier in the embodiment 1, the UE may change CSI (e.g. first CSI) calculated based on the CSI-RS to CSI (e.g., second CSI) based on the CRS port in consideration of the matrix M. In this case, the W1 and the W2 correspond to the first CSI and 'M*W1' and 'M*W2' may correspond to the second CSI. Or, the UE may directly calculate the second CSI without passing through a process of calculating the first CSI and modifying the first CSI. In particular, the 2 codebooks based operation scheme may be applied to the 2Tx and/or 4Tx antennas system by defining and using the mapping relation between antenna ports while using 2 codebooks for the legacy 8Tx.

Figure 11:
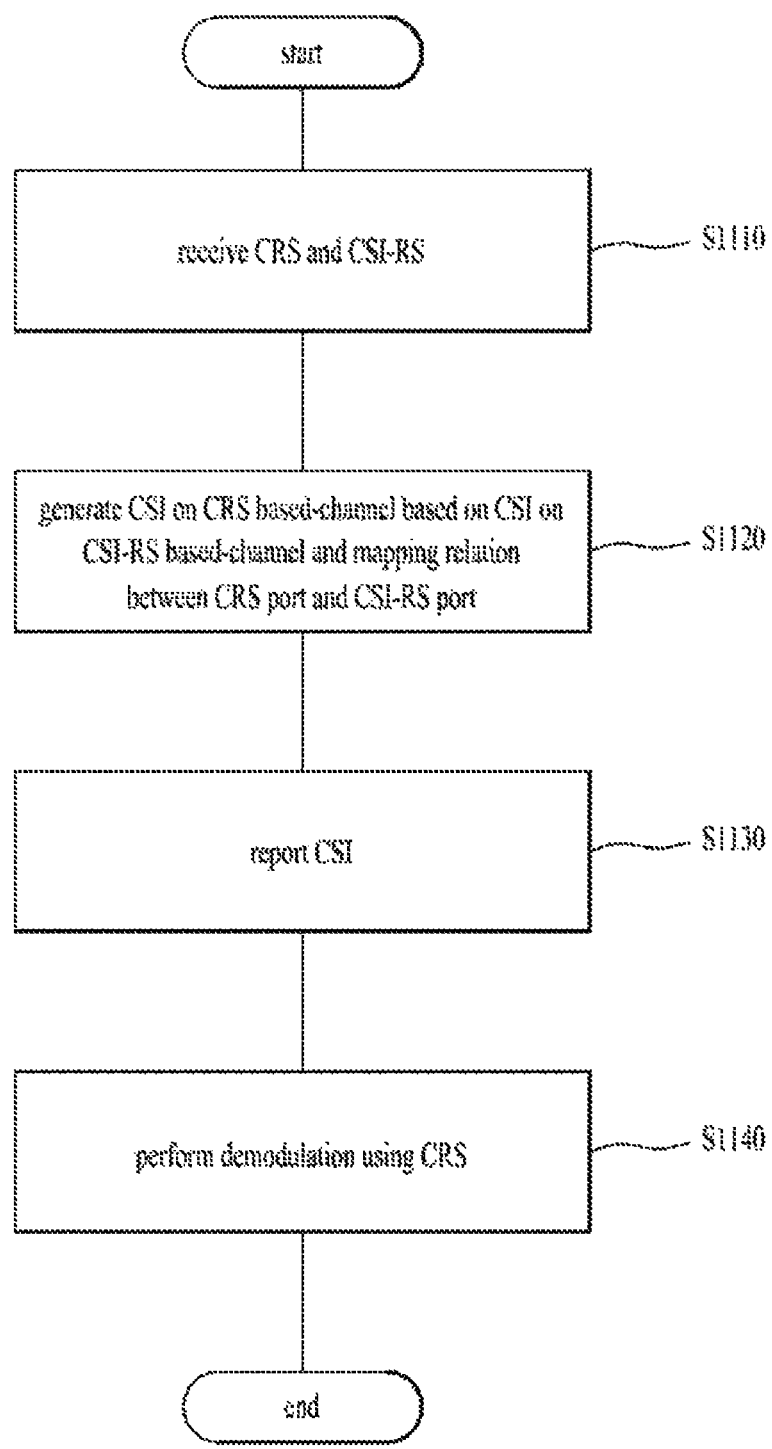
FIG. 11 is a flowchart for a channel estimating method using a reference signal according to the present invention.

FIG. 11 is a flowchart for a channel estimating method using a reference signal according to the present invention.

In the step S1110, a UE may receive a CRS and a CSI-RS from a base station. The UE may correspond to a UE in which a transmission mode (e.g., TM X) for generating and reporting CSI based on the CSI-RS and performing demodulation based on the CRS is configured.

In the step S1120, the UE may generate the CSI on a CRS based-channel (e.g., a channel corresponding to the CRS port or a channel estimated using the CRS) based on the CSI on a CSI-RS based-channel (e.g., a channel corresponding to a CSI-RS port or a channel estimated using the CSI-RS) and a mapping relation (e.g., a matrix M in the aforementioned embodiments) between the CRS port and the CSI-RS port. This is because since the CSI on the CSI-RS based-channel may not precisely reflect a state of the channel (i.e., the CRS based-channel) used for data demodulation, the UE needs to report the CSI on the CRS based-channel to a base station.

In this case, the UE may directly generate the CSI (e.g., second CSI) on the CRS based-channel without generating the CSI (e.g., first CSI) on the CSI-RS based-channel. Or, the UE may generate the second CSI in a manner of modifying the first CSI in consideration of the mapping relation between the CRS port and the CSI-RS port after generating the first CSI on the CSI-RS based-channel.

In the step S1130, the UE may report the generated CSI (e.g., second CSI) to the base station.

Or, the UE may report both the first CSI and the second CSI to the base station. For instance, the UE may report the second CSI to the base station after reporting the first CSI to the base station.

In the step S1140, the UE may perform data demodulation based on the channel estimated using the CRS.

In this case, the mapping relation between two or more among the CRS port, the CSI-RS port and a data layer may be defined as what is explained in the aforementioned Formula 3 to 12. And, in order to simplify an operation of the UE, such a scheme as rank restriction, port restriction and the like may be applied. In particular, the UE may generate/calculate the first CSI and/or the second CSI based on an assumption that there does not exist a DMRS (or UE-specific RS). And, DMRS based-data demodulation or CRS based-data demodulation may be performed according to whether an MBSFN subframe is configured and the UE may obtain relevant information via downlink scheduling information (or a DCI format). And, if a narrowband CRS is configured, the CRS based-demodulation may be performed instead of the DMRS based-demodulation irrespective of whether the MBSFN subframe is configured.

Or, the UE reports the first CSI to the base station as it is and may not report the second CSI. In this case, as mentioned earlier in the embodiment 2, the base station calculates a proper precoding matrix for the channel of the CRS port and may inform the UE of the precoding matrix. Since the detailed operation of the base station is duplicated with what is mentioned in the embodiment 2, it is omitted here for clarity.

The aforementioned items explained in various embodiments of the present invention may be implemented in a manner of being independently applied or in a manner that two or more embodiments are simultaneously applied. For clarity, explanation on the overlapped contents is omitted.

In explaining various embodiments of the present invention, a main entity of downlink transmission is mainly explained by an example of a base station and a main entity of downlink reception is mainly explained by an example of a user equipment, by which a scope of the present invention may be non-limited. In particular, in case that a relay becomes the main entity of the downlink transmission to the UE or the relay becomes the main entity of uplink reception from the UE, or in case that the relay becomes the main entity of the uplink transmission to the base station or the relay becomes the main entity of downlink reception from the base station, the principle of the present invention explained via various embodiments may be identically applied as well.

Figure 12:
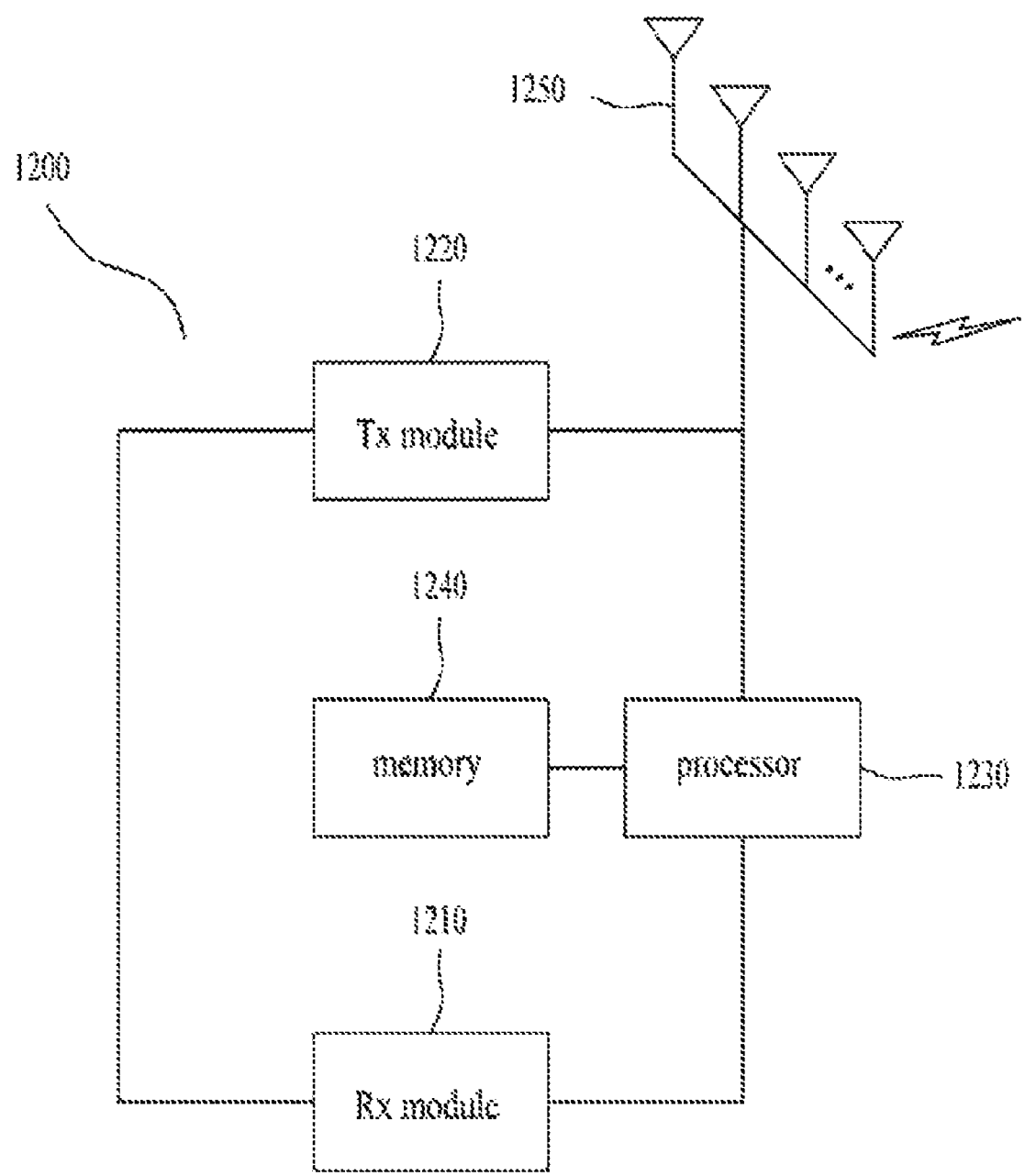
FIG. 12 is a diagram for a configuration of a preferred embodiment for a user equipment device according to the present invention.

FIG. 12 is a diagram for a configuration of a preferred embodiment for a user equipment device according to the present invention.

Referring to FIG. 12, a user equipment device 1200 according to the present invention may include a reception module 1210, a transmission module 1220, a processor 1230, a memory 1240, and a plurality of antennas 1250. A plurality of the antennas 1250 indicates a user equipment device supporting MIMO transmission and reception. The reception module 1210 may receive various signal, data, and information from external (e.g., base station). The transmission module 1220 may transmit various signals, data, and information to the external (e.g., base station). The processor 1230 may control overall operations of the user equipment device 1200.

The user equipment device 1200 according to one example of the present invention may be configured to perform channel estimation. The processor 1230 may be configured to receive a CRS and a CSI-RS using the reception module 1210. And, the processor 1230 may be configured to generate CSI on a channel estimated using the CRS based on CSI on a channel estimated using the CSI-RS and a mapping relation between the CRS port and the CSI-RS port. And, the processor 1230 may be configured to report the generated CSI to the base station using the transmission module. And, the processor 1230 may be configured to demodulate data based on the channel estimated using the CRS.

Besides, the processor 1230 of the user equipment device 1200 performs a function of calculating information received by the user equipment device 1200, information to be transmitted to the external and the like. The memory 1240 may store the calculated information and the like for a predetermined time and may be replaced with such a configuration element as a buffer (not depicted) or the like.

Detail configuration of the aforementioned user equipment device 1200 may be implemented in a manner that the aforementioned items explained in various embodiments of the present invention are independently applied or two or more embodiments are simultaneously applied. For clarity, explanation on the duplicated contents is omitted.

Although it is not depicted in FIG. 12, a base station device may be configured to transmit the CRS, the CSI-RS and data to the user equipment device 1200 via the transmission module. And, the base station device may be configured to receive the CSI on the CSI-RS based-channel and the CSI on the CRS based-channel, which is generated in consideration of a mapping relation between the CRS port and the CSI-RS port, from the user equipment via the reception module. The base station may provide information on the mapping relation between the CRS port and the CSI-RS port to the UE. Or, the base station receives the CSI on the CSI-RS based-channel from the user equipment via the reception module, determines a precoding matrix (e.g., P2 in Formula 13) compensating for the CRS based-channel and the CSI-RS based-channel, and may inform the user equipment of the precoding matrix via the transmission module.

Explanation on the user equipment device 1200 in FIG. 12 may be identically applied to a relay node device as an uplink transmission main entity or a downlink reception main entity. And, explanation on the base station may be identically applied to the relay node device as a downlink transmission main entity or an uplink transmission main entity.

Embodiments of the present invention may be implemented using various means. For instance, embodiments of the present invention may be implemented using hardware, firmware, software and/or any combinations thereof.

In the implementation by hardware, a method according to each embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention may be implemented by modules, procedures, and/or functions for performing the above-explained functions or operations. Software code is stored in a memory unit and is then drivable by a processor. The memory unit is provided within or outside the processor to exchange data with the processor through the various means known in public.

Detailed explanation on the preferred embodiment of the present invention disclosed as mentioned in the foregoing description is provided for those in the art to implement and execute the present invention. While the present invention has been described and illustrated herein with reference to the preferred embodiments thereof, it will be apparent to those skilled in the art that various modifications and variations may be made therein without departing from the spirit and scope of the invention. For instance, those skilled in the art may use each component described in the aforementioned embodiments in a manner of combining it with each other. Hence, the present invention may be non-limited to the aforementioned embodiments of the present invention and intends to provide a scope matched with principles and new characteristics disclosed in the present invention.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The aforementioned embodiments of the present invention may be applied to various mobile communication systems.

What is claimed is:

1. A method of estimating a channel by a user equipment in a wireless communication system, comprising:
receiving a cell-specific reference signal (CRS) and a channel state information-reference signal (CSI-RS) from a base station;
generating, by the user equipment, CSI based on a channel estimated using the CRS;
reporting, by the user equipment, the generated CSI to the base station; and
demodulating, by the user equipment, data based on the channel estimated using the CRS,
wherein the CSI is generated based on a value obtained by applying a mapping relation matrix indicating a mapping relation between a CSI-RS port and a CRS port, which is the CRS is received through,
wherein the generating, by the user equipment, CSI comprises:
generating a first CSI based on the channel estimated using the CSI-RS; and
generating a second CSI by modifying the first CSI based on the mapping relation between the CRS port and the CSI-RS port, and
wherein the reporting the generated CSI comprises transmitting the second CSI.

2. The method of claim 1, wherein the mapping relation is defined as $$\begin{bmatrix} y_{15} \\ \vdots \\ y_{14+CSIRSp} \end{bmatrix} = M \begin{bmatrix} z_0 \\ \vdots \\ z_{CRSp-1} \end{bmatrix},$$

wherein $CSIRS_p$ corresponds to a number of the CSI-RS port, $y_i$ corresponds to an $i^{th}$ CSI-RS port,
wherein $CRS_p$ corresponds to a number of the CRS port, $Z_j$ corresponds to a $j^{th}$ CRS port, and
wherein M corresponds to a matrix indicating the mapping relation between the CRS port and the CSI-RS port.

3. The method of claim 2, wherein the matrix M corresponds to a composition matrix consisting of an identity matrix or identity rows.

4. The method of claim 1, wherein a mapping relation between a layer of the data and the CRS port is defined as $$\begin{bmatrix} z_0 \\ \vdots \\ z_{CRSp-1} \end{bmatrix} = W \begin{bmatrix} x_1 \\ \vdots \\ x_l \end{bmatrix},$$

wherein $CRS_p$ corresponds to a number of the CRS port, $Z_j$ corresponds to a $j^{th}$ CRS port,
wherein l corresponds to a number of the layer of the data, $X_k$ corresponds to a $k^{th}$ layer, and
wherein W corresponds to a precoding matrix applied to the data.

5. The method of claim 4, wherein if a single CSI-RS port is configured, the W corresponds to 1, and
wherein if two or more CSI-RS port are configured, the W corresponds to the precoding matrix applied to the data.

6. The method of claim 1, wherein a mapping relation between a layer of the data and the CSI-RS port is defined as $$\begin{bmatrix} y_{15} \\ \vdots \\ y_{14+CSIRSp} \end{bmatrix} = MW \begin{bmatrix} x_1 \\ \vdots \\ x_l \end{bmatrix},$$

wherein $CSIRS_p$ corresponds to a number of the CSI-RS port, $y_i$ corresponds to an $i^{th}$ CSI-RS port,
wherein l corresponds to a number of the layer of the data, $X_k$ corresponds to a $k^{th}$ layer,
wherein M corresponds to the mapping relation between the CRS port and the CSI-RS port, and
wherein W corresponds to a precoding matrix applied to the data.

7. The method of claim 1, wherein a mapping relation between a layer of the data, the CRS port and the CSI-RS port is defined as $$\begin{bmatrix} y_{15} \\ \vdots \\ y_{14+CSIRSp} \end{bmatrix} = MW \begin{bmatrix} x_1 \\ \vdots \\ x_l \end{bmatrix} = M \begin{bmatrix} z_0 \\ \vdots \\ z_{CRSp-1} \end{bmatrix},$$

wherein $CSIRS_p$ corresponds to a number of the CSI-RS port, $y_i$ corresponds to an $i^{th}$ CSI-RS port,
wherein $CRS_p$ corresponds to a number of the CRS port, Z corresponds to a $j^{th}$ CRS port,
wherein l corresponds to a number of the layer of the data, $X_k$ corresponds to a $k^{th}$ layer,
wherein M corresponds to the mapping relation between the CRS port and the CSI-RS port, and
wherein W corresponds to a precoding matrix applied to the data.

8. The method of claim 1, wherein a maximum rank fed back by the user equipment is configured by a minimum value among a number of the CSI-RS port and a number of the CRS port.

9. The method of claim 1, wherein a number of the CSI-RS port is configured identical to a number of the CRS port.

10. The method of claim 1, wherein the CSI is calculated based on an assumption that no UE-specific reference signal exists.

11. The method of claim 1, wherein the data is demodulated based on the CRS in a subframe configured as a non-MBSFN (multicast-broadcast single frequency network) subframe, and
wherein the data is demodulated based on a UE-specific reference signal in a subframe configured as an MBSFN subframe.

12. The method of claim 1, wherein if a narrowband CRS is applied, the data is demodulated based on the CRS in a non-MBSFN subframe and an MBSFN subframe.

13. The method of claim 1, wherein the user equipment is configured with a transmission mode for calculating the first CSI using the CSI-RS and performing demodulation using the CRS.

14. A user equipment device estimating a channel in a wireless communication system, comprising:
 a transmission module;
 a reception module; and
 a processor,
 the processor configured to:
 receive a cell-specific reference signal (CRS) and a channel state information-reference signal (CSI-RS) from a base station using the reception module,
 generate CSI on a channel estimated using the CRS,
 report the generated CSI to the base station using the transmission module, and
 demodulate data based on the channel estimated using the CRS,
 wherein the CSI is generated based on a value obtained by applying a mapping relation matrix indicating a mapping relation between a CSI-RS port and a CRS port, which is the CRS is received through,
 wherein the generate CSI comprises:
 generate a first CSI based on the channel estimated using the CSI-RS; and
 generate a second CSI by modifying the first CSI based on the mapping relation between the CRS port and the CSI-RS port, and
 wherein the report the generated CSI comprises transmitting the second CSI.

* * * * *